(12) United States Patent
Ikkaku et al.

(10) Patent No.: US 10,901,785 B2
(45) Date of Patent: Jan. 26, 2021

(54) TASK DEPLOYMENT METHOD, TASK DEPLOYMENT APPARATUS, AND STORAGE MEDIUM

(71) Applicant: FUJITSU LIMITED, Kawasaki (JP)

(72) Inventors: Kento Ikkaku, Kawasaki (JP); Kouichirou Amemiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 15/987,473

(22) Filed: May 23, 2018

(65) Prior Publication Data

US 2018/0341527 A1    Nov. 29, 2018

(30) Foreign Application Priority Data

May 29, 2017   (JP) .................................. 2017-105480

(51) Int. Cl.
*G06F 9/48* (2006.01)
*G06F 9/50* (2006.01)

(52) U.S. Cl.
CPC .......... *G06F 9/4887* (2013.01); *G06F 9/4881* (2013.01); *G06F 9/5027* (2013.01); *G06F 9/5038* (2013.01); *G06F 9/5044* (2013.01)

(58) Field of Classification Search
CPC .... G06F 9/5044; G06F 9/5027; G06F 9/4881; G06F 9/4887; G06F 9/5038
See application file for complete search history.

(56) References Cited

U.S. PATENT DOCUMENTS

| 9,563,510 B2* | 2/2017 | Golbourn ............ G06F 11/1088 |
| 2004/0215780 A1 | 10/2004 | Kawato |
| 2006/0020701 A1* | 1/2006 | Parekh .................. G06F 9/4856 |
| | | 709/226 |

(Continued)

FOREIGN PATENT DOCUMENTS

| JP | 6-243112 | 9/1994 |
| JP | 2004-302748 | 10/2004 |

(Continued)

OTHER PUBLICATIONS

J. Rasley, K. Karanasos, S. Kandula, R. Fonseca, M. Vojnovic, and S. Rao., "Efficient queue management for cluster scheduling", in Proceedings of the Eleventh European Conference on Computer Systems, p. 36. ACM, 2016 (Year: 2016).*

*Primary Examiner* — Jacob D Dascomb
(74) *Attorney, Agent, or Firm* — Staas & Halsey, LLP

(57) ABSTRACT

A task deployment method executed by a processor of a task development apparatus, the task development method includes acquiring, at a predetermined interval, a number of processes in a queue that stores the processes executed by a plurality of calculation devices included in at least one of one or more nodes; determining, for each of the plurality of calculation devices, a process execution rate for a new process; calculating, for each of the plurality of calculation devices, an execution completion point for the new process based on the acquired number of processes in the queue and the determined process execution rate for each of the respective calculation devices; and determining, from among the plurality of calculation devices, a calculation device to execute the new process based on the calculated execution completion point for each of the plurality of calculation devices.

15 Claims, 45 Drawing Sheets

(56) References Cited

U.S. PATENT DOCUMENTS

| | | | | |
|---|---|---|---|---|
| 2011/0161978 A1* | 6/2011 | Jang | ................. | G06F 9/505 |
| | | | | 718/104 |
| 2013/0263142 A1 | 10/2013 | Miyamae | | |
| 2014/0229221 A1* | 8/2014 | Shih | ................. | G06F 9/5061 |
| | | | | 705/7.23 |
| 2014/0380326 A1* | 12/2014 | Kurihara | ............... | G06F 9/4881 |
| | | | | 718/102 |
| 2015/0154056 A1* | 6/2015 | Chen | .................. | G06F 9/4856 |
| | | | | 718/103 |
| 2017/0337090 A1* | 11/2017 | Baines | .................. | G06F 9/546 |

FOREIGN PATENT DOCUMENTS

| | | |
|---|---|---|
| JP | 2013-205880 | 10/2013 |
| JP | 2016-507121 | 3/2016 |

\* cited by examiner

FIG. 15

| [M1] INPUT DATA ||
|---|---|
| TRANSMISSION SOURCE ADDRESS ||
| DESTINATION ADDRESS ||
| INPUT DATA | ANY FORMAT |

FIG. 16

| [M2] INPUT DATA ||
|---|---|
| TRANSMISSION SOURCE ADDRESS ||
| DESTINATION ADDRESS ||
| INPUT DATA | ANY FORMAT |

FIG. 17

| [M3] EXECUTION TASK ||
|---|---|
| TRANSMISSION SOURCE ADDRESS ||
| DESTINATION ADDRESS ||
| TASK ID | ID FOR SPECIFYING TASK |
| PROCESSING TARGET DATA | ANY FORMAT |

FIG. 18

| [M4] EXECUTION RESULT DATA ||
|---|---|
| TRANSMISSION SOURCE ADDRESS ||
| DESTINATION ADDRESS ||
| TASK ID | ID FOR SPECIFYING EXECUTION TASK |
| EXECUTION RESULT DATA | ANY FORMAT |

FIG. 19

| [M5] EXECUTION RESULT DATA | |
|---|---|
| TRANSMISSION SOURCE ADDRESS | |
| DESTINATION ADDRESS | |
| TASK ID | ID FOR SPECIFYING EXECUTION TASK |
| EXECUTION RESULT DATA | ANY FORMAT |

FIG. 20

| [M6] DISTRIBUTION DESTINATION USER MESSAGE ||
|---|---|
| TRANSMISSION SOURCE ADDRESS ||
| DESTINATION ADDRESS ||
| TASK ID | ID FOR SPECIFYING EXECUTION TASK |
| USER ADDRESS ||

FIG. 21

| [M7] EXECUTION RESULT DATA ||
|---|---|
| TRANSMISSION SOURCE ADDRESS ||
| DESTINATION ADDRESS ||
| TASK ID | ID FOR SPECIFYING EXECUTION TASK |
| EXECUTION RESULT DATA | ANY FORMAT |

FIG. 22

| [M8] TASK PROCESSING REQUEST MESSAGE | | |
|---|---|---|
| TRANSMISSION SOURCE ADDRESS | | |
| DESTINATION ADDRESS | | |
| TASK ID | ID FOR SPECIFYING EXECUTION TASK | |
| CONSTRAINT CONDITION | | |
| | REQUEST ALGORITHM | DEADLINE SATISFACTION RATIO MAXIMIZATION/ RESPONSE DELAY MINIMIZATION |
| | REQUEST TIME | TIME LIMIT BY WHICH TASK EXECUTION RESULT IS TRANSMITTED |

FIG. 23

| [M9] TASK EXECUTION CONSTRAINT MESSAGE | | |
|---|---|---|
| TRANSMISSION SOURCE ADDRESS | | |
| DESTINATION ADDRESS | | |
| TASK ID | ID FOR SPECIFYING EXECUTION TASK | |
| CONSTRAINT CONDITION | | |
| | REQUEST ALGORITHM | DEADLINE SATISFACTION RATIO MAXIMIZATION/RESPONSE DELAY MINIMIZATION |
| | REQUEST TIME | TIME LIMIT BY WHICH TASK EXECUTION RESULT IS TRANSMITTED |

FIG. 24

| [M10] QUEUE STATE MESSAGE |||
|---|---|---|
| TRANSMISSION SOURCE ADDRESS |||
| DESTINATION ADDRESS |||
| QUEUE STATE | | |
| | TASK EXECUTION NODE ID | ID FOR SPECIFYING TASK EXECUTION NODE |
| | NUMBER OF EXISTING TASKS | NUMBER OF EXISTING TASKS FROM HEAD TO VACANCY OF QUEUE |
| | AVERAGE PROCESS EXECUTION RATE | AVERAGE PROCESS EXECUTION RATE OF ALL TASKS EXECUTED IN PAST |

FIG. 25

| [M11] TASK EXECUTION ORDER SECURING REQUEST MESSAGE | | |
|---|---|---|
| TRANSMISSION SOURCE ADDRESS | | |
| DESTINATION ADDRESS | | |
| EXECUTION ORDER SECURING | | |
| | TASK EXECUTION NODE ID | ID FOR SPECIFYING TASK EXECUTION NODE |

FIG. 26

| [M12] OFFER REFUSAL MESSAGE |||
|---|---|---|
| TRANSMISSION SOURCE ADDRESS |||
| DESTINATION ADDRESS |||
| EXECUTION ORDER RELEASE | | |
| | TASK EXECUTION NODE ID | ID FOR SPECIFYING TASK EXECUTION NODE |
| | TASK ID | ID FOR SPECIFYING IDLE TASK |

TASK DEPLOYMENT METHOD, TASK DEPLOYMENT APPARATUS, AND STORAGE MEDIUM

CROSS-REFERENCE TO RELATED APPLICATION

This application is based upon and claims the benefit of priority of the prior Japanese Patent Application No. 2017-105480, filed on May 29, 2017, the entire contents of which are incorporated herein by reference.

FIELD

The embodiment discussed herein is related to a task deployment method, a task deployment apparatus, and a storage medium.

BACKGROUND

In the related art, there is a cloud system which includes a plurality of nodes and in which any node executes a process on data obtained from Internet of Things (IoT) device and transmits an execution result to a terminal apparatus of a user. For example, a distributed processing technique such as Hadoop or a distributed resource management technique such as Mesos is applied to the cloud system.

As the related art, there is a technique in which execution of a task is started at a time point at which a schedule is set by using, for example, one or more selected computing resources. For example, there is a technique of allocating a plurality of tasks to a single processing unit in common among a plurality of task processing units as a task allocation destination. For example, there is a technique in which a resource to which a job is allocated is determined after a temporary reservation operation is executed on a resource management device, and job reservation is executed. For example, there is a technique of distributing a processing unit to other processors such that a processing time can be reduced through parallel execution.

Japanese National Publication of International Patent Application No. 2016-507121, Japanese Laid-open Patent Publication No. 2013-205880, Japanese Laid-open Patent Publication No. 2004-302748, and Japanese Laid-open Patent Publication No. 6-243112 are examples of the related art.

However, in the related art, it is hard to complete execution of a process by a predetermined time limit. For example, if a certain node is to execute a process, it may not determine with high accuracy to determine whether or not execution of a process is completed by a predetermined time limit. In view of the above, it is desirable that it is capable of deploying a process to a calculation device which appears to complete execution of the process by a predetermined time limit.

SUMMARY

According to an aspect of the invention, a task deployment method executed by a processor of a task development apparatus, the task development method includes acquiring, at a predetermined interval, a number of processes in a queue that stores the processes executed by a plurality of calculation devices included in at least one of one or more nodes; determining, for each of the plurality of calculation devices, a process execution rate for a new process; calculating, for each of the plurality of calculation devices, an execution completion point for the new process based on the acquired number of processes in the queue and the determined process execution rate for each of the respective calculation devices; and determining, from among the plurality of calculation devices, a calculation device to execute the new process based on the calculated execution completion point for each of the plurality of calculation devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is an explanatory diagram illustrating an example of a first message;

FIG. 16 is an explanatory diagram illustrating an example of a second message;

FIG. 17 is an explanatory diagram illustrating an example of a third message;

FIG. 18 is an explanatory diagram illustrating an example of a fourth message;

FIG. 19 is an explanatory diagram illustrating an example of a fifth message;

FIG. 20 is an explanatory diagram illustrating an example of a sixth message;

FIG. 21 is an explanatory diagram illustrating an example of a seventh message;

FIG. 22 is an explanatory diagram illustrating an example of an eighth message;

FIG. 23 is an explanatory diagram illustrating an example of a ninth message;

FIG. 24 is an explanatory diagram illustrating an example of a tenth message;

FIG. 25 is an explanatory diagram illustrating an example of an eleventh message;

FIG. 26 is an explanatory diagram illustrating an example of a twelfth message;

DESCRIPTION OF EMBODIMENT

Hereinafter, with reference to the drawings, an embodiment of a task deployment program, a task deployment method, and a task deployment apparatus will be described in detail.

One Example of Task Deployment Method According to Embodiment

Figure 1:
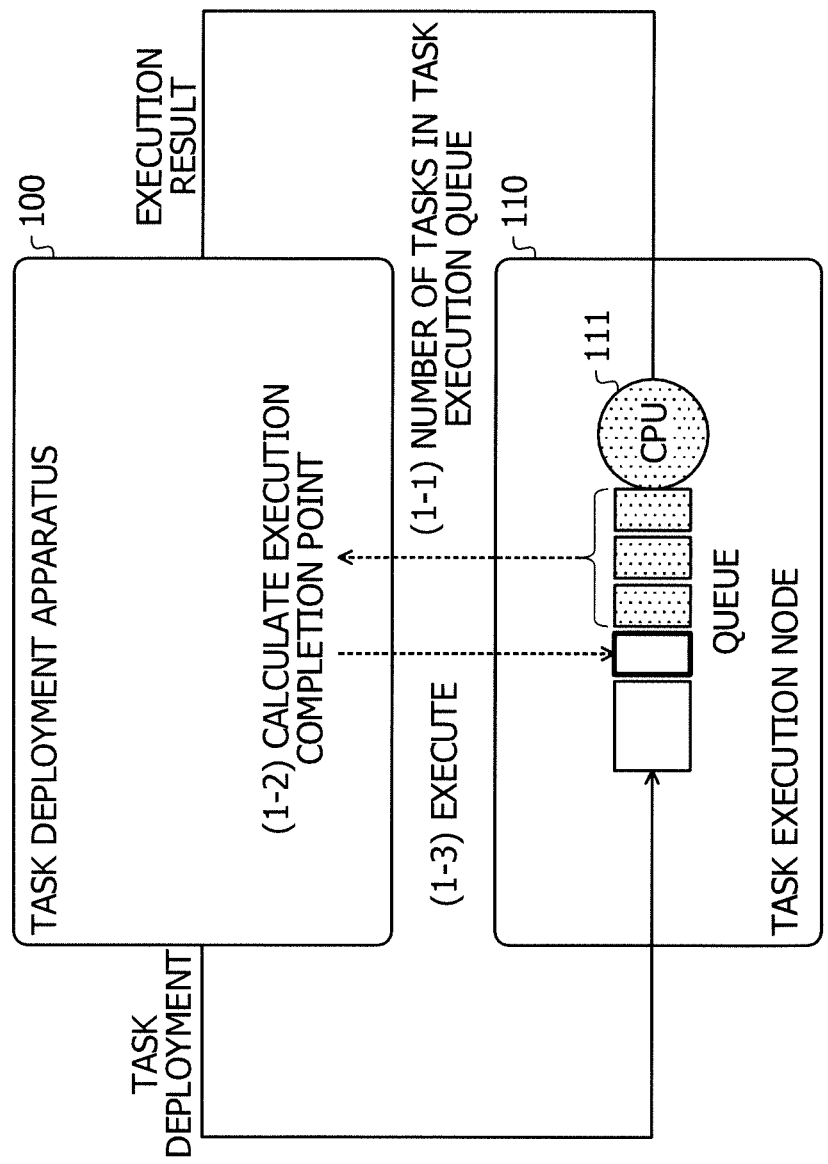
FIG. 1 is an explanatory diagram illustrating one Example of a task deployment method according to an embodiment.

FIG. 1 is an explanatory diagram illustrating one Example of a task deployment method according to an embodiment. In FIG. 1, a task deployment apparatus 100 is a computer which controls a system including a plurality of nodes 110. The task deployment apparatus 100 controls, for example, a process deployment location. Each of the nodes 110 includes a calculation device. The calculation device is, for example, a central processing unit (CPU) 111. The process is, for example, a task. The deployment location is a calculation device executing a process.

Here, when a process deployment location is controlled, there is a tendency to preferably determine a deployment location in which execution of a process appears to be completed by a predetermined time limit. However, it is hard to determine a deployment location in which execution of a process is completed by a predetermined time limit.

For example, there may be a case where a process deployment location is controlled according to a distributed resource management technique such as Mesos. In this case, for example, a process deployment location may be determined without determining whether or not execution of a process is completed by a predetermined time limit if which node is to execute the process, and thus execution of the process may not be completed by the predetermined time limit.

In contrast, in a case where a node is to execute a new process based on the number of processes in the node and a process execution rate in the node, an execution completion point until execution of the new process is completed may be estimated, and it may be determined whether or not execution of the new process is completed by a predetermined time limit. However, in a case where a node executes a plurality of processes, the node tends to execute the plurality of processes at predetermined time intervals. Thus, in a case where the number of processes in the node changes in real time, a process execution completion point also changes in real time. Therefore, it may not determine with high accuracy whether or not execution of a new process executed by the node is completed by a predetermined time limit.

Therefore, in the present embodiment, a description will be made of a task deployment method in which a queue is provided in a calculation device, processes executed by the calculation device are managed by the queue, and an execution completion point of a process executed by the calculation device is estimated based on the number of processes in the queue and a process execution rate in the calculation device. According thereto, a process can be deployed to a calculation device which appears to complete execution of the process by a predetermined time limit.

In the example illustrated in FIG. 1, the task deployment apparatus 100 can perform communication with one or more nodes 110. The node 110 includes one or more calculation devices. The calculation device has a queue storing a process. The calculation device executes a process extracted from the queue one by one. In the following description, the node 110 will be referred to as a "task execution node 110" in some cases.

(1-1) The task deployment apparatus 100 acquires the number of processes in a queue storing a process executed by the calculation device included in any task execution node 110 among one or more task execution nodes 110, at a predetermined interval. The predetermined interval is set by, for example, a manufacturer or a manager of the task deployment apparatus 100 in advance.

The task deployment apparatus 100 acquires the number of tasks in a queue storing a task executed by the CPU 111 included in any task execution node 110, for example, until a predetermined timing at a predetermined interval. The predetermined timing is, for example, a timing at which a new process to be executed by the task execution node 110 occurs. Specifically, the task deployment apparatus 100 acquires the number of tasks "3" in the queue of the CPU 111. Consequently, in a case where the CPU 111 is to execute a new task, the task deployment apparatus 100 can specify the number of tasks of which execution is completed before the CPU 111 executes the new task.

(1-2) The task deployment apparatus 100 calculates an execution completion point for a new process in a case where a calculation device is to execute the new process for each calculation device based on the acquired number of processes for the calculation device and a process execution rate in the calculation device. The process execution rate is a value indicating the number of processes of which execution is completed per unit time. The unit of the process execution rate is, for example, number/s. The process execution rate is set in advance, for example, through communication with the task execution node 110. The execution completion point is a time point at which execution of a new process executed by a calculation device is completed, and is a time point at which an execution completion time elapses from the present time. The execution completion time is, for example, the time taken for execution of a new process executed by a calculation device to be completed from the present time.

For example, the task deployment apparatus 100 calculates an execution completion point for a new task for each CPU 111 based on the number of tasks for the CPU 111, acquired until a predetermined timing, and a task execution rate in the CPU 111. Specifically, the task deployment apparatus 100 adds "1" corresponding to a new task to the acquired number of tasks "3", and thus calculates the number of tasks "4" in a queue of the CPU 111 in a case where the CPU 111 is to execute the new task. The task deployment apparatus 100 divides the number of tasks "4" by the process execution rate "0.5/s" in the CPU 111 so as to calculate an execution completion time "8 s". The task deployment apparatus 100 calculates a time point at which the execution completion time elapses from the present time as an execution completion point. Consequently, in a case where the CPU 111 executes a new task, the task deployment apparatus 100 can specify an execution completion point for the new task.

(1-3) The task deployment apparatus 100 determines any task execution node 110 among one or more task execution nodes 110 as a calculation device which is to execute a new task based on an execution completion point calculated for each calculation device. For example, the task deployment apparatus 100 determines the CPU 111 for which an execution completion point is closest to the present time and which is included in any task execution node 110 among one or more task execution nodes 110 as the CPU 111 which is to execute a new task.

Consequently, the task deployment apparatus 100 can deploy the new task to the CPU 111 which appears to complete execution of a process by a predetermined time limit. For example, in a case where a new task is generated, the task deployment apparatus 100 can deploy the new task to the CPU 111 which appears to complete execution of a process by a predetermined time limit among the CPUs 111 in which the number of processes is acquired most recently.

In a case where the number of processes is acquired, the task deployment apparatus 100 may add a dummy process to a queue. Consequently, even if another process is added to the queue until a new task is generated, the task deployment apparatus 100 can cause the CPU 111 to execute the new task such that execution of the new task is completed by a calculated execution completion point.

Herein, a description has been made of a case where the task deployment apparatus 100 determines a calculation device in which an execution completion point is closest to the present time as a calculation device which is to execute a new task, but this is only an example. For example, the task deployment apparatus 100 may determine a calculation device in which an execution completion point is a time point before a predetermined time limit as a calculation device which is to execute a new task.

Herein, a description has been made of a case where the task execution node 110 has a queue in the unit of a calculation device, but this is only an example. For example, the task execution node 110 may have a queue in the unit of the task execution node 110, and processes extracted from the queue may be shared and executed by a plurality of calculation devices included in the task execution node 110.

Herein, a description has been made of a case where a process execution rate is not variable regardless of the type of process, but this is only an example. For example, a process execution rate may differ depending on the type of process, and the task deployment apparatus 100 may store a process execution rate for each type of process.

Example of Task Deployment System 200

Next, with reference to FIG. 2, a description will be made of an example of a task deployment system 200 to which the task deployment apparatus 100 illustrated in FIG. 1 is applied.

Figure 2:
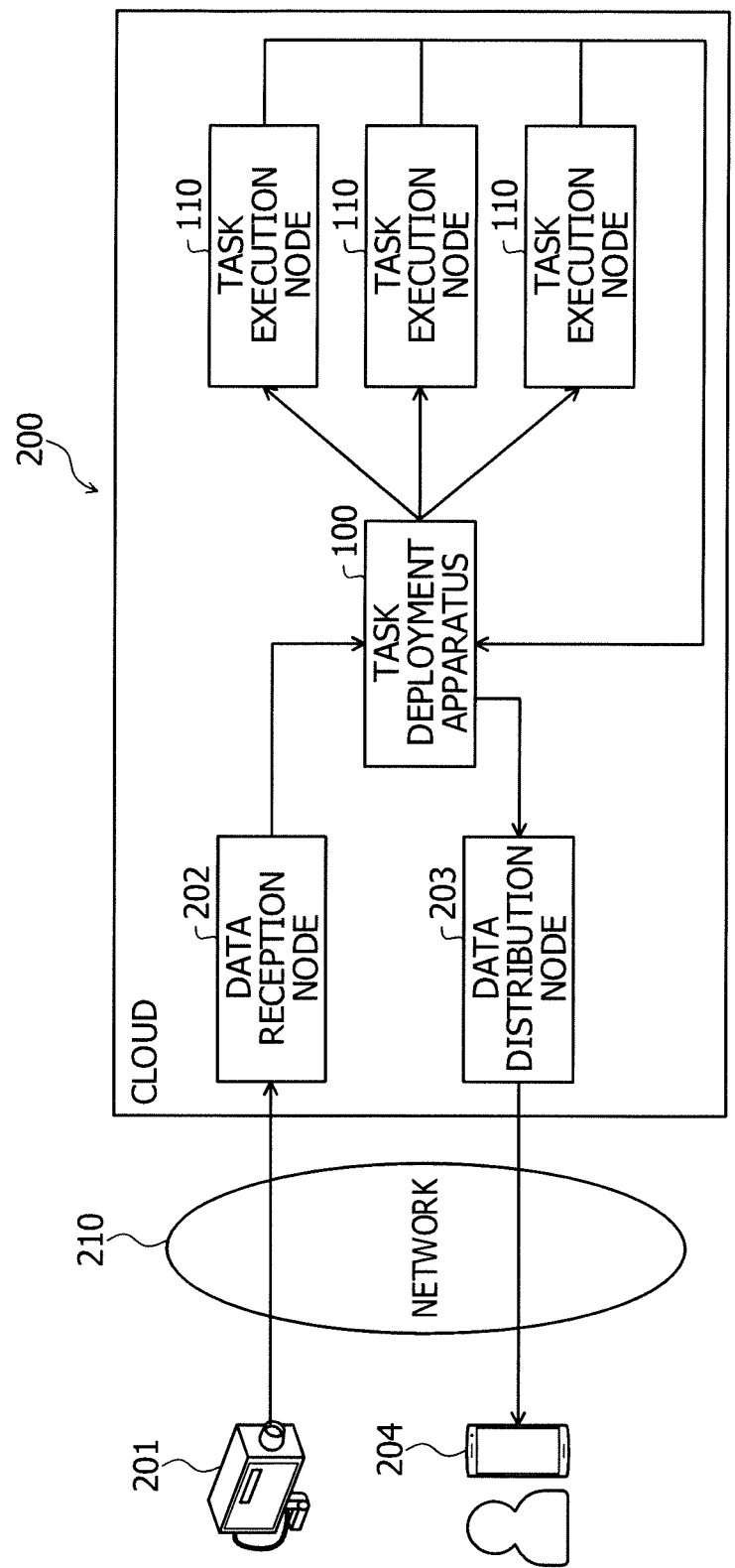
FIG. 2 is an explanatory diagram illustrating an example of a task deployment system.

FIG. 2 is an explanatory diagram illustrating an example of the task deployment system 200. In FIG. 2, the task deployment system 200 includes a data generation apparatus 201, a data reception node 202, the task deployment apparatus 100, a plurality of task execution nodes 110, a data distribution node 203, and a client apparatus 204.

In the task deployment system 200, the data generation apparatus 201 and the data reception node 202 are connected to each other via wired or wireless network 210. The network 210 is, for example, a local area network (LAN), a wide area network (WAN), the Internet, or the like.

The data reception node 202 and the task deployment apparatus 100 are communicably connected to each other in a wired or wireless manner. The task deployment apparatus 100 and each of the task execution nodes 110 are communicably connected to each other in a wired or wireless manner. The task deployment apparatus 100 and the data distribution node 203 are communicably connected to each other in a wired or wireless manner. The data distribution node 203 and the client apparatus 204 are connected to each other via the wired or wireless network 210.

The data generation apparatus 201 is a computer which generates data used for a task, and transmits the data to the task deployment apparatus 100 via the data reception node 202. In the following description, data used for a task will also be referred to as "processing target data" in some cases. The data generation apparatus 201 is, for example, a personal computer (PC), a notebook PC, a tablet terminal, a smart phone, a wearable terminal, an imaging apparatus, or a sensor apparatus. The data generation apparatus 201 is, for example, an IoT device.

The data reception node 202 is a computer which transmits the processing target data received from the data generation apparatus 201 to the task deployment apparatus 100. The data reception node 202 is, for example, a server, a PC, a notebook PC, a tablet terminal, a smart phone, or a wearable terminal.

The task deployment apparatus 100 receives the processing target data from the data reception node 202. The task deployment apparatus 100 receives the number of tasks in a queue corresponding to each CPU, a task execution rate in each CPU, and the like, from the task execution node 110. The task deployment apparatus 100 determines a CPU which is a deployment location of a task using the received processing target data. The task deployment apparatus 100 transmits a request for execution of the task using the received data to the task execution node 110 having the CPU determined as a deployment location. The task deployment apparatus 100 is, for example, a server, a PC, or a notebook PC.

The task execution node 110 is a computer having one or more CPUs. The task execution node 110 has a queue corresponding to the CPU. The task execution node 110 transmits the number of tasks in the queue, a task execution rate in the CPU, and the like to the task deployment apparatus 100. The task execution node 110 executes a task by using the CPU, and transmits a task execution result to the task deployment apparatus 100. The task execution node 110 is, for example, a PC, a notebook PC, a tablet terminal, a smart phone, or a wearable terminal.

The data distribution node 203 is a computer which transmits the task execution result received from the task deployment apparatus 100 to the client apparatus 204. The data distribution node 203 is, for example, a server, a PC, a notebook PC, a tablet terminal, a smart phone, or a wearable terminal.

The client apparatus 204 is a computer which outputs the task execution result received from the data distribution node 203. The client apparatus 204 displays, for example, a process execution result on a display. The client apparatus 204 is, for example, a PC, a notebook PC, a tablet terminal, a smart phone, or a wearable terminal.

Hardware Configuration Example of Task Deployment Apparatus 100

Next, a description will be made of a hardware configuration example of the task deployment apparatus 100 with reference to FIG. 3.

Figure 3:
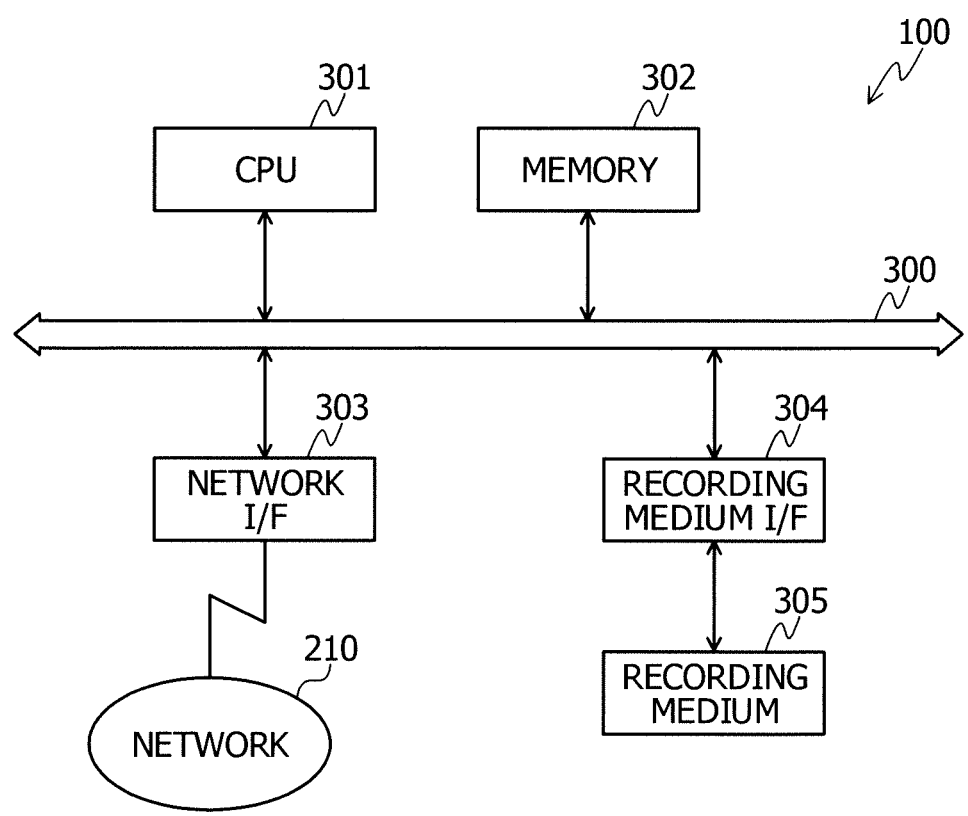
FIG. 3 is a block diagram illustrating a hardware configuration example of a task deployment apparatus.

FIG. 3 is a block diagram illustrating a hardware configuration example of the task deployment apparatus 100. In FIG. 3, the task deployment apparatus 100 includes a CPU 301, a memory 302, a network interface (I/F) 303, a recording medium I/F 304, and a recording medium 305. The respective constituent elements are connected to each other via a bus 300.

Here, the CPU 301 controls the entire task deployment apparatus 100. The memory 302 includes, for example, a read only memory (ROM), a random access memory (RAM), a flash ROM, and the like. Specifically, for example, various programs are stored in the flash ROM or the ROM, and the RAM is used as a work area of the CPU 301. The programs stored in the memory 302 are loaded to the CPU 301, and thus cause a process which is being coded to be executed by the CPU 301. The memory 302 stores various databases (DBs) which will be described later in FIGS. 4 to 7.

The network I/F 303 is connected to the network 210 via a communication line, and is connected to other computers via the network 210. The network I/F 303 functions as an internal interface with the network 210, and controls input and output of data from and to other computers. For example, a modem or a LAN adaptor may be employed in the network I/F 303.

The recording medium I/F 304 controls read/write of data for the recording medium 305 under the control of the CPU 301. The recording medium I/F 304 is, for example, a disk driver, a solid state drive (SSD), or a Universal Serial Bus (USB) port. The recording medium 305 is a nonvolatile memory storing written data under the control of the recording medium I/F 304. The recording medium 305 is, for example, a semiconductor memory or a USB memory. The recording medium 305 may be attachable to and detachable from the task deployment apparatus 100.

The task deployment apparatus 100 may include, for example, a keyboard, a mouse, a display, a printer, a scanner, a microphone, and a speaker in addition to the above-described constituent elements. The task deployment apparatus 100 may not include the recording medium I/F 304 or the recording medium 305.

Example of Storage Content of Task Execution Node Management DB 400

Next, with reference to FIG. 4, a description will be made of an example of the storage content of a task execution node management DB 400. The task execution node management DB 400 is realized by, for example, a storage region such as the memory 302 or the recording medium 305 of the task deployment apparatus 100 illustrated in FIG. 3.

Figure 4:
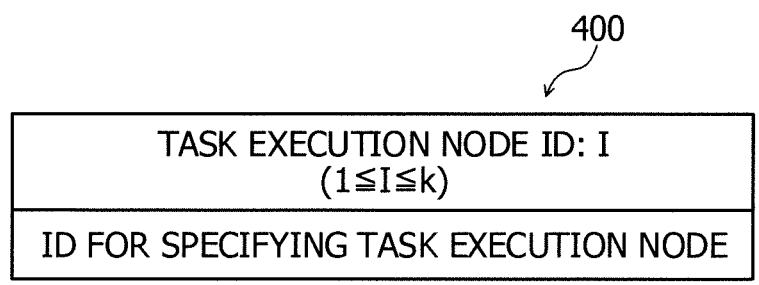
FIG. 4 is an explanatory diagram illustrating an example of the storage content of a task execution node management DB.

FIG. 4 is an explanatory diagram illustrating an example of the storage content of the task execution node management DB 400. As illustrated in FIG. 4, the task execution node management DB 400 has a field of a task execution node ID. In the task execution node management DB 400, information is set in each field, and thus management information of the task execution node 110 is stored as a record.

A task execution node ID is set in the field of a task execution node ID. The task execution node ID is an ID for specifying the task execution node 110. The task execution node ID is, for example, I. I is an integer of 1 to k. Here, k is the number of task execution nodes 110 in the task deployment system 200.

Example of Storage Content of Offer Information DB 500

Next, with reference to FIG. 5, a description will be made of an example of the storage content of an offer information DB 500. The offer information DB 500 is realized by, for example, a storage region such as the memory 302 or the recording medium 305 of the task deployment apparatus 100 illustrated in FIG. 3.

Figure 5:
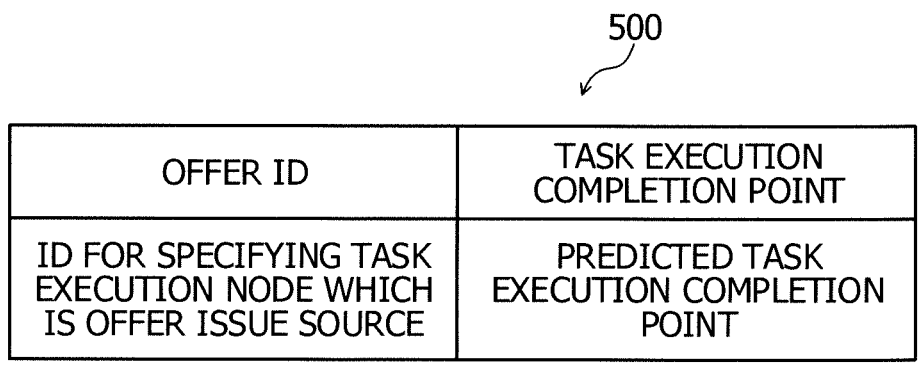
FIG. 5 is an explanatory diagram illustrating an example of the storage content of an offer information DB.

FIG. 5 is an explanatory diagram illustrating an example of the storage content of the offer information DB 500. As illustrated in FIG. 5, the offer information DB 500 has a field of a task execution completion point in correlation with a field of an offer ID. In the offer information DB 500, information is set in each field, and thus offer information is stored as a record.

An offer ID is set in the field of an offer ID. The offer ID is an ID for specifying the task execution node 110 which is an issue source of an offer. The offer is an offer indicating that the task execution node 110 can execute a number of tasks, from the task execution node 110. A task execution completion point in the task execution node 110 which is an offer issue source is set in the field of a task execution completion point. The task execution completion point is a predicted task execution completion point.

Example of Storage Content of Task Management DB 600

Next, with reference to FIG. 6, a description will be made of an example of the storage content of a task management DB 600. The task management DB 600 is realized by, for example, a storage region such as the memory 302 or the recording medium 305 of the task deployment apparatus 100 illustrated in FIG. 3.

Figure 6:
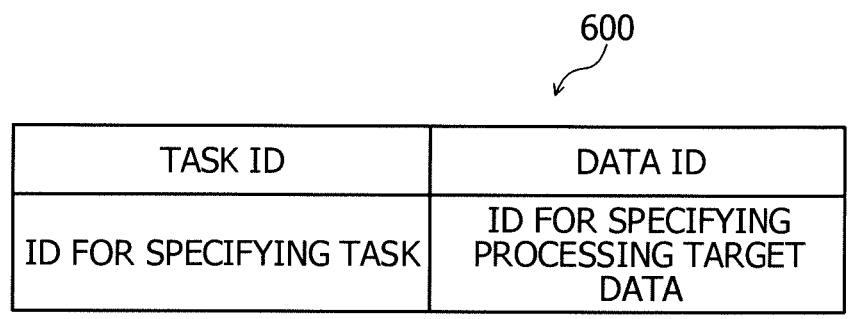
FIG. 6 is an explanatory diagram illustrating an example of the storage content of a task management DB.

FIG. 6 is an explanatory diagram illustrating an example of the storage content of the task management DB 600. As illustrated in FIG. 6, the task management DB 600 has a field of a data ID in correlation with a field of a task ID. In the task management DB 600, information is set in each field, and thus task management information is stored as a record.

A task ID is set in the field of a task ID. The task ID is an ID for specifying a task. A data ID is set in the field of a data ID. The data ID is an ID for specifying processing target data used for a task corresponding to the task ID.

Example of Storage Content of Data Management DB 700

Next, with reference to FIG. 7, a description will be made of an example of the storage content of a data management DB 700. The data management DB 700 is realized by, for example, a storage region such as the memory 302 or the recording medium 305 of the task deployment apparatus 100 illustrated in FIG. 3.

Figure 7:
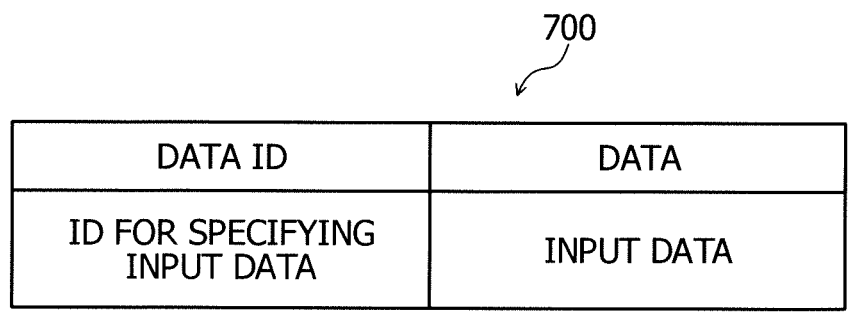
FIG. 7 is an explanatory diagram illustrating an example of the storage content of a data management DB.

FIG. 7 is an explanatory diagram illustrating an example of the storage content of the data management DB 700. As illustrated in FIG. 7, the data management DB 700 has a field of data in correlation with a field of a data ID. In the data management DB 700, information is set in each field, and thus data is stored as a record.

A data ID is set in the field of a data ID. The data ID is an ID for specifying input data which is processing target data and is received from the data generation apparatus 201 via the data reception node 202. The input data indicated by the data ID is set in the field of data. For example, the input data which is received from the data generation apparatus 201 via the data reception node 202 is set in the field of data.

Hardware Configuration Example of Data Generation Apparatus 201

A hardware configuration example of the data generation apparatus 201 is the same as, for example, the hardware configuration example of the task deployment apparatus 100 illustrated in FIG. 3, and thus description thereof will be omitted. The data generation apparatus 201 may further include an imaging element, a sensor, or the like. The sensor is, for example, an acceleration sensor, an angular velocity sensor, a magnetic sensor, or a vibration sensor.

Hardware Configuration Example of Data Reception Node 202

A hardware configuration example of the data reception node 202 is the same as, for example, the hardware configuration example of the task deployment apparatus 100 illustrated in FIG. 3, and thus description thereof will be omitted.

Hardware Configuration Example of Task Execution Node 110

Next, with reference to FIG. 8, a description will be made of a hardware configuration example of the task execution node 110.

Figure 8:
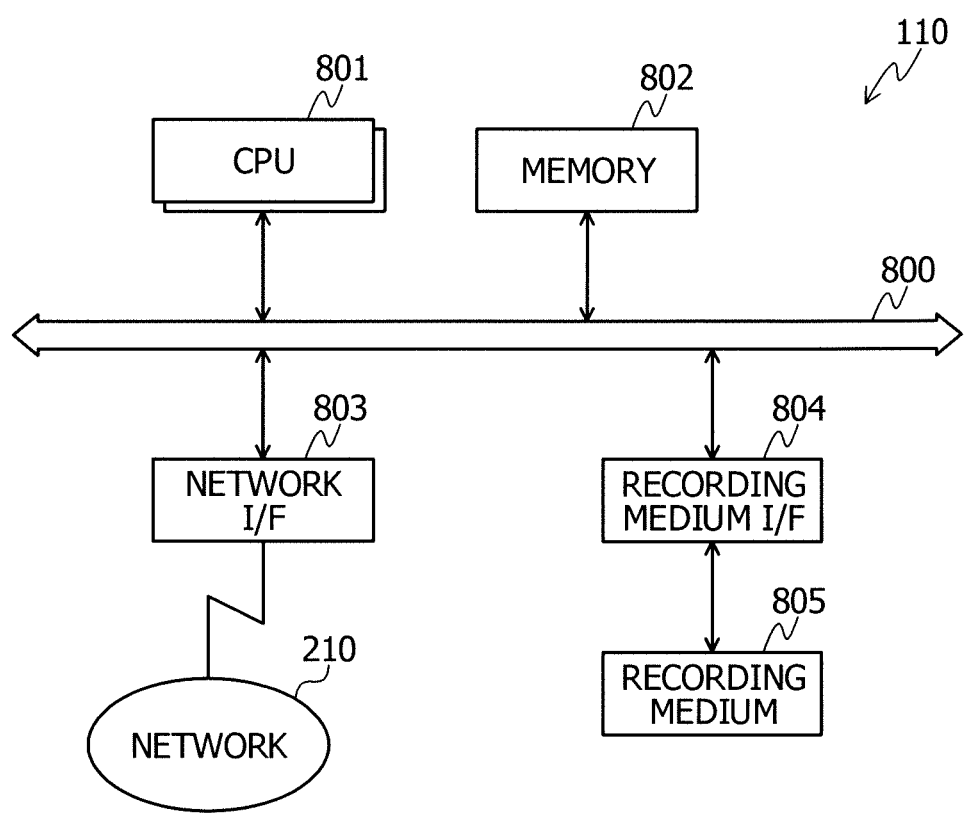
FIG. 8 is a block diagram illustrating a hardware configuration example of a task execution node.

FIG. 8 is a block diagram illustrating a hardware configuration example of the task execution node 110. In FIG. 8, the task execution node 110 includes one or more CPUs 801, a memory 802, a network I/F 803, a recording medium I/F 804, and a recording medium 805. The respective constituent elements are connected to each other via a bus 800.

Here, the CPUs 801 control the entire task execution node 110. The memory 802 includes, for example, a ROM, a RAM, and a flash ROM. Specifically, for example, various programs are stored in the flash ROM or the ROM, and the RAM is used as a work area of each of the CPUs 801. The programs stored in the memory 802 are loaded to the CPU 801, and thus cause a process which is being coded to be executed by the CPU 801. The memory 802 stores various DBs which will be described later in FIGS. 9 to 11.

The network I/F 803 is connected to the network 210 via a communication line, and is connected to other computers via the network 210. The network I/F 803 functions as an internal interface with the network 210, and controls input and output of data from and to other computers. For example, a modem or a LAN adaptor may be employed in the network I/F 803.

The recording medium I/F 804 controls read/write of data for the recording medium 805 under the control of the CPU 801. The recording medium I/F 804 is, for example, a disk driver, an SSD, or a USB port. The recording medium 805 is a nonvolatile memory storing written data under the control of the recording medium I/F 804. The recording medium 805 is, for example, a semiconductor memory or a USB memory. The recording medium 805 may be attachable to and detachable from the task execution node 110.

The task execution node 110 may include, for example, a keyboard, a mouse, a display, a printer, a scanner, a microphone, and a speaker in addition to the above-described constituent elements. The task execution node 110 may not include the recording medium I/F 804 or the recording medium 805.

Example of Storage Content of Queue State DB 900

Next, with reference to FIG. 9, a description will be made of an example of the storage content of a queue state DB 900. The queue state DB 900 is realized by, for example, a storage region such as the memory 802 or the recording medium 805 of the task execution node 110 illustrated in FIG. 8.

Figure 9:
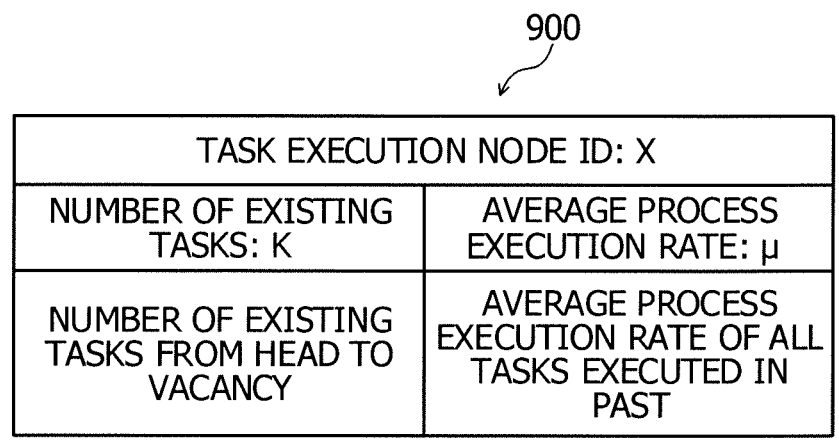
FIG. 9 is an explanatory diagram illustrating an example of the storage content of a queue state DB.

FIG. 9 is an explanatory diagram illustrating an example of the storage content of the queue state DB 900. As illustrated in FIG. 9, the queue state DB 900 has fields of the number of existing tasks and an average process execution rate in correlation with a field of a task execution node ID. In the queue state DB 900, information is set in each field, and thus a queue state is stored as a record.

A task execution node ID is set in the field of a task execution node ID. The task execution node ID is an ID for specifying the task execution node 110 storing the queue state DB 900. The task execution node ID is, for example, X. X is an integer of 1 to k. Here, k is the number of task execution nodes 110 in the task deployment system 200.

The number of existing tasks is set in the field of the number of existing tasks. The number of existing tasks is the number of existing tasks from the head to a vacancy of a task execution queue 1000 which will be described in FIG. 10 and is included in the task execution node 110 indicated by the task execution node ID. An average process execution rate is set in the field of an average process execution rate. The average process execution rate is an average process execution rate of all tasks executed in the past by the task execution node 110 indicated by the task execution node ID.

For example, the queue state DB 900 is prepared for each CPU 801 of the task execution node 110. For example, the task execution node 110 stores the queue state DB 900 for managing the task execution queue 1000 storing an executed task for each CPU 801. The task execution node 110 may store a single queue state DB 900 for managing the task execution queue 1000 storing tasks which are shared and executed by one or more CPUs 801.

Example of Storage Content of Task Execution Queue 1000

Next, with reference to FIG. 10, a description will be made of an example of the storage content of the task execution queue 1000. The task execution queue 1000 is realized by, for example, a storage region such as the memory 802 or the recording medium 805 of the task execution node 110 illustrated in FIG. 8.

Figure 10:
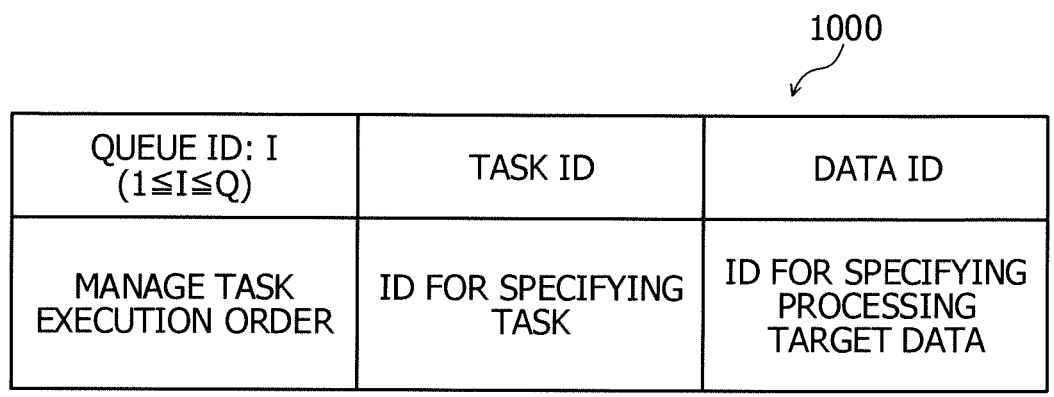
FIG. 10 is an explanatory diagram illustrating an example of the storage content of a task execution queue.

FIG. 10 is an explanatory diagram illustrating an example of the storage content of the task execution queue 1000. As illustrated in FIG. 10, the task execution queue 1000 has fields of a task ID and a data ID in correlation with a field of a queue ID. In the task execution queue 1000, information is set in each field, and thus task deployment information is stored as a record.

A queue ID is set in the field of a queue ID. The queue ID is an ID for managing an execution order of tasks stored in the task execution queue 1000. The queue ID is, for example, I. I is an integer of 1 to Q. Q is, for example, the number of tasks which can be stored in the task execution queue 1000.

A task ID is set in the field of a task ID. The task ID is an ID for specifying a task stored in the task execution queue 1000. The task ID is, for example, an ID for specifying the type of task. The type of task includes an idle task. A data ID for specifying processing target data used for a task corresponding to the task ID is set in the field of a data ID. The data ID is NULL in a case where the task ID indicates an idle task.

The task execution queue 1000 is based on, for example, first in first out (FIFO). For example, the task execution queue 1000 is prepared for each CPU 801 of the task execution node 110. For example, the task execution node 110 stores the task execution queue 1000 storing an executed task for each CPU 801. The task execution node 110 may store a single task execution queue 1000 storing tasks which are shared and executed by one or more CPUs 801.

Example of Storage Content of Data Management DB 1100

Next, with reference to FIG. 11, a description will be made of an example of the storage content of the data management DB 1100. The data management DB 1100 is realized by, for example, a storage region such as the memory 802 or the recording medium 805 of the task execution node 110 illustrated in FIG. 8.

Figure 11:
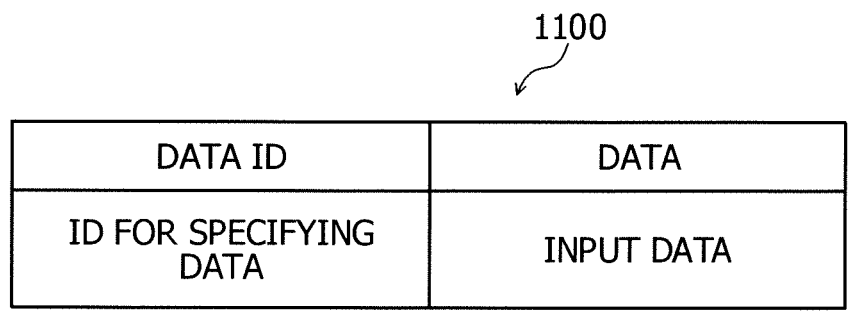
FIG. 11 is an explanatory diagram illustrating an example of the storage content of a data management DB.

FIG. 11 is an explanatory diagram illustrating an example of the storage content of the data management DB 1100. As illustrated in FIG. 11, the data management DB 1100 has a field of data in correlation with a field of a data ID. In the data management DB 1100, information is set in each field, and thus data is stored as a record.

A data ID is set in the field of a data ID. The data ID is an ID for specifying input data which is processing target data and is received from the data generation apparatus 201 via the data reception node 202. The input data indicated by the data ID is set in the field of data. For example, the input data which is received from the data generation apparatus 201 via the data reception node 202 is set in the field of data.

Hardware Configuration Example of Data Distribution Node 203

A hardware configuration example of the data distribution node 203 is the same as, for example, the hardware configuration example of the task deployment apparatus 100 illustrated in FIG. 3, and thus description thereof will be omitted.

Hardware Configuration Example of Client Apparatus 204

A hardware configuration example of the client apparatus 204 is the same as, for example, the hardware configuration example of the task deployment apparatus 100 illustrated in FIG. 3, and thus description thereof will be omitted.

Example of Storage Content of User DB 1200

Next, with reference to FIG. 12, a description will be made of an example of the storage content of a user DB 1200. The user DB 1200 is realized by, for example, a storage region such as the memory 302 or the recording medium 305 of the task deployment apparatus 100 illustrated in FIG. 3, or a storage region such as the memory 802 or the recording medium 805 of the task execution node 110 illustrated in FIG. 8.

Figure 12:
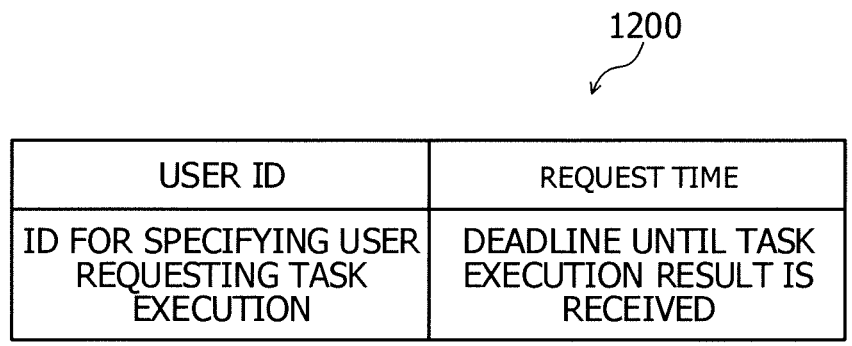
FIG. 12 is an explanatory diagram illustrating an example of the storage content of a user DB.

FIG. 12 is an explanatory diagram illustrating an example of the storage content of the user DB 1200. As illustrated in FIG. 12, the user DB 1200 has a field of request time in correlation with a field of a user ID. In the user DB 1200, information is set in each field, and thus user information is stored as a record.

A user ID is set in the field of a user ID. The user ID is an ID for specifying a user of the client apparatus 204 having transmitted a task execution request. Request time is set in the field of request time. The request time is a deadline indicating a time limit by which a task execution result is received. The user DB 1200 may be included in the data distribution node 203 or the client apparatus 204.

Functional Configuration Examples of Task Deployment Apparatus 100 and Task Execution Node 110

Next, with reference to FIG. 13, a description will be made of functional configuration examples of the task deployment apparatus 100 and the task execution node 110.

Figure 13:
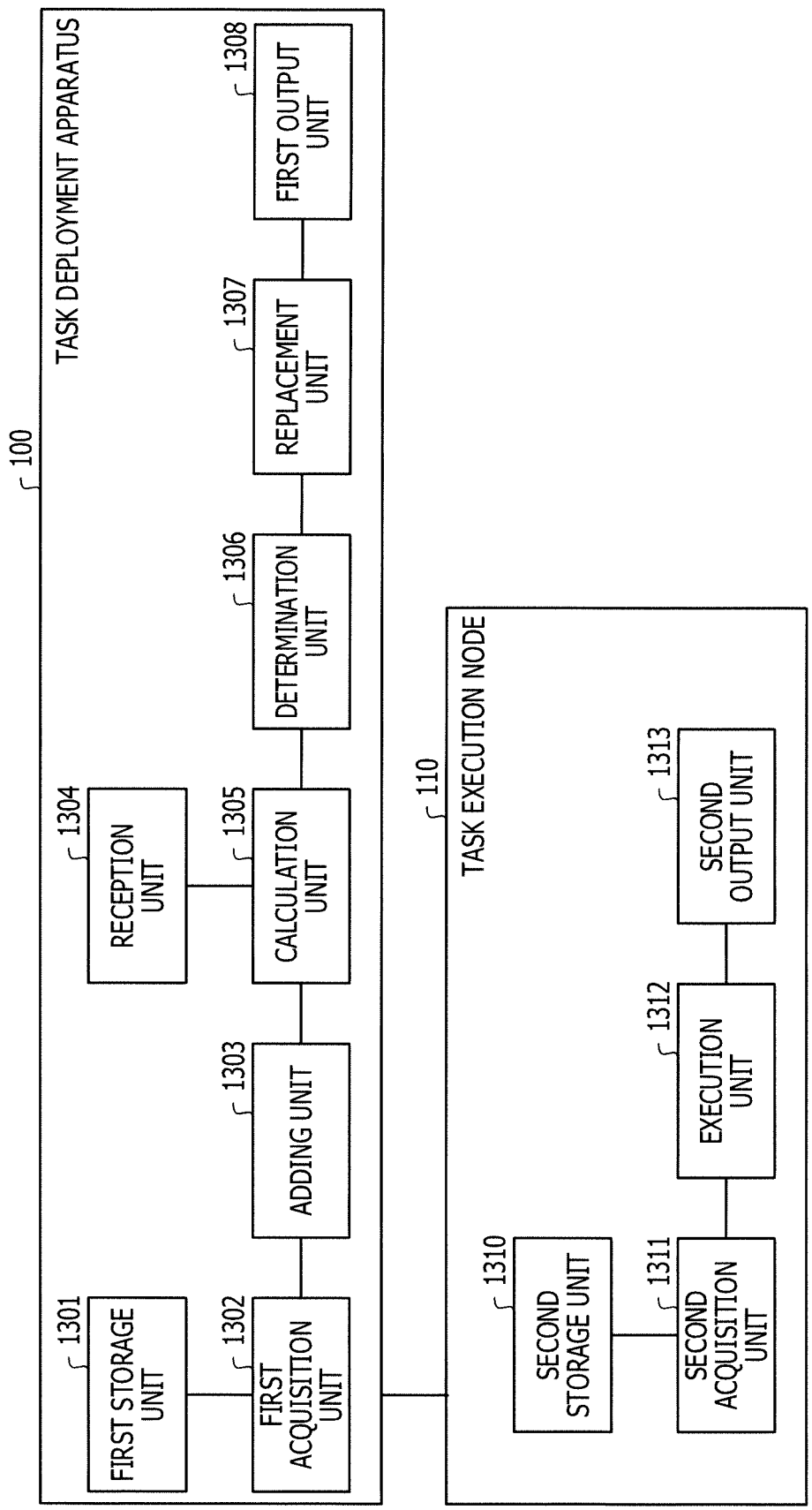
FIG. 13 is a block diagram illustrating functional configuration examples of the task deployment apparatus and the task execution node.

FIG. 13 is a block diagram illustrating functional configuration examples of the task deployment apparatus 100 and the task execution node 110. The task deployment apparatus 100 includes a first storage unit 1301, a first acquisition unit 1302, an adding unit 1303, a reception unit 1304, a calculation unit 1305, a determination unit 1306, a replacement unit 1307, and a first output unit 1308.

The first storage unit 1301 is realized by, for example, a storage region such as the memory 302 or the recording medium 305 illustrated in FIG. 3. The first acquisition unit 1302 to the first output unit 1308 realize functions of a control unit. Specifically, for example, the functions of the first acquisition unit 1302 to the first output unit 1308 are realized by the CPU 301 executing the program stored in the storage region such as the memory 302 or the recording medium 305 illustrated in FIG. 3, or by the network I/F 303. A processing result in each functional unit is stored in, for example, the storage region such as the memory 302 or the recording medium 305 illustrated in FIG. 3.

The first storage unit 1301 stores information for managing one or more nodes 110. The node 110 is, for example, the task execution node 110 illustrated in FIG. 8. The first storage unit 1301 stores, for example, the task execution node management DB 400 illustrated in FIG. 4. The first storage unit 1301 stores an execution completion point for a process executed by the task execution node 110. The process is, for example, a task. The first storage unit 1301 stores, for example, the offer information DB 500 illustrated in FIG. 5.

The first storage unit 1301 stores information for managing a task. The first storage unit 1301 stores, for example, the task management DB 600 illustrated in FIG. 6. The first storage unit 1301 stores information for managing processing target data used for a task. The first storage unit 1301 stores, for example, the data management DB 700 illustrated in FIG. 7. Consequently, each functional unit can refer to the storage content of the various DBs of the first storage unit 1301 in a process therein.

The first acquisition unit 1302 acquires the number of tasks in a queue storing a task executed by a calculation device included in any task execution node 110 among one or more task execution nodes 110 at a predetermined interval. The calculation device is, for example, the CPU 801 of the task execution node 110 illustrated in FIG. 8. The queue is, for example, the task execution queue 1000 illustrated in FIG. 10.

The first acquisition unit 1302 acquires, for example, the number of tasks in the task execution queue 1000 storing a task executed by the CPU 801 which is randomly selected from among a plurality of CPUs 801 included in one or more task execution nodes 110 at a predetermined interval. Specifically, the first acquisition unit 1302 acquires the storage content of the queue state DB 900 from the task execution node 110 including the randomly selected CPU 801, and acquires the number of tasks in the task execution queue 1000, at a predetermined interval. Consequently, at a predetermined interval, the first acquisition unit 1302 can specify the number of tasks in the randomly selected CPU 801, and can thus acquire an index for calculating a task execution completion point in a case where the randomly selected CPU 801 executes a new task.

For example, the first acquisition unit 1302 may acquire the number of tasks in the task execution queue 1000 storing a task executed by each of a plurality of CPUs 801 included in one or more task execution nodes 110 at a predetermined interval. Specifically, the first acquisition unit 1302 acquires the storage content of the queue state DB 900 corresponding to each CPU 801 of the task execution node 110 from each of one or more task execution nodes 110 at a predetermined interval. The first acquisition unit 1302 acquires the number of tasks in the task execution queue 1000 from the storage content of the queue state DB 900 corresponding to each CPU 801 of the task execution node 110. Consequently, at a predetermined interval, the first acquisition unit 1302 can specify the number of tasks in each CPU 801, and can thus acquire an index for calculating a task execution completion point in a case where each CPU 801 executes a new task.

For example, the first acquisition unit 1302 may acquire a task execution rate in the CPU 801 in addition to the number of tasks in the task execution queue 1000 storing a task executed by the CPU 801 at a predetermined interval. Specifically, the first acquisition unit 1302 acquires the storage content of the queue state DB 900 corresponding to each CPU 801 of the task execution node 110 from each of one or more task execution nodes 110 at a predetermined interval. The first acquisition unit 1302 acquires the number of tasks in the task execution queue 1000 from the storage content of the queue state DB 900 corresponding to each CPU 801 of the task execution node 110. Consequently, the first acquisition unit 1302 can acquire an index for calculating a task execution completion point in a case where each CPU 801 executes a new task, at a predetermined interval.

The adding unit 1303 adds a dummy task to the task execution queue 1000 in the task execution node 110 including the CPU 801 in a case where the number of tasks in the task execution queue 1000 storing a task executed by the CPU 801 is acquired. The dummy task is, for example, an idle task. The adding unit 1303 transmits, for example, an execution order securing request for adding an idle task to the task execution queue 1000, to the task execution node 110 including the CPU 801. Consequently, the adding unit 1303 can add the idle task which can be replaced with a new task to the task execution queue 1000 in a case where the new task is generated in the future.

The adding unit 1303 adds an idle task to the task execution queue 1000 in the task execution node 110 including the CPU 801 in which a relatively small number of tasks is acquired among a plurality of CPUs 801. The adding unit 1303 transmits an execution order securing request for adding an idle task to the task execution queue 1000, to the task execution node 110 including the CPU 801 in which a relatively small number of tasks is acquired. Consequently, the adding unit 1303 can add the idle task which can be replaced with a new task to the task execution queue 1000 in a case where the new task is generated in the future.

The reception unit 1304 receives an execution request for a new task. The execution request for a new task includes a transmission time limit for an execution result of the new task. The transmission time limit is a deadline. For example, in a case where a new task using processing target data in the data generation apparatus 201 is generated, the reception unit 1304 receives an execution request including a deadline from the client apparatus 204 which is a transmission destination of an execution result of the new task.

The calculation unit 1305 calculates an execution completion point for a new task in a case where the new task is executed by the CPU 801 for each CPU 801 based on the number of tasks for the CPU 801 acquired by the first acquisition unit 1302 and a task execution rate in the CPU 801. For example, the calculation unit 1305 calculates a time point after a task execution completion time obtained by multiplying the number of tasks for the CPU 801 by the task execution rate in the CPU 801 elapses from the present time, as the execution completion point for a new task for each CPU 801. Consequently, the calculation unit 1305 can calculate an execution completion point for a new task as an index for determining the CPU 801 which is to execute the new task.

The calculation unit 1305 may calculate an execution completion point for a new task for each CPU 801 based on the number of tasks for the CPU 801 acquired by the first acquisition unit 1302 and a task execution rate corresponding to the type of new task. For example, the calculation unit 1305 calculates an execution completion point for a new task in a case where the new task is executed by the CPU 801 for each CPU 801 in response to reception of an execution request. Consequently, the calculation unit 1305 can calculate an execution completion point for a new task as an index for determining the CPU 801 which is to execute the new task.

The determination unit 1306 determines the CPU 801 included in any task execution node 110 among one or more task execution nodes 110 as the CPU 801 which is to execute a new task based on the execution completion point calculated for each CPU 801.

The determination unit 1306 determines, for example, the CPU 801 in which the calculated execution completion point is earlier than the transmission time limit included in the received execution request as the CPU 801 which is to execute a new task. Consequently, the determination unit 1306 can improve a probability that a new task may be completed by the transmission time limit.

The determination unit 1306 determines the CPU 801 for which the calculated execution completion point is closest to the present time as the CPU 801 which is to execute a new task. Consequently, the determination unit 1306 can improve a probability that a new task may be completed by the transmission time limit.

In a case where the CPU 801 which is to execute a new task is determined, the replacement unit 1307 replaces the idle task added to the task execution queue 1000 with the new task in the task execution node 110 including the CPU 801 which is to execute the new task. For example, in a case where the CPU 801 which is to execute a new task is determined, the replacement unit 1307 transmits a replacement request to the task execution node 110 including the CPU 801 which is to execute the new task. Consequently, the replacement unit 1307 can cause the task execution node 110 to execute the new task.

The first output unit 1308 outputs an execution result of the new task executed by the task execution node 110. An output form is, for example, display on a display, printing output to a printer, transmission to an external apparatus using the network I/F 303, or storage in the storage region such as the memory 302 or the recording medium 305. The external apparatus is, for example, the client apparatus 204 which is a transmission source of an execution request for the new task executed by the task execution node 110. The first output unit 1308 may output a processing result in each functional unit.

On the other hand, the task execution node 110 includes a second storage unit 1310, a second acquisition unit 1311, an execution unit 1312, and a second output unit 1313.

The second storage unit 1310 is realized by, for example, a storage region such as the memory 802 or the recording medium 805 of the task execution node 110 illustrated in FIG. 8. The second acquisition unit 1311 to the second output unit 1313 realize functions of a control unit. Specifically, for example, the functions of the second acquisition unit 1311 to the second output unit 1313 are realized by the CPU 801 executing the program stored in the storage region such as the memory 802 or the recording medium 805 illustrated in FIG. 8, or by the network I/F 803. A processing result in each functional unit is stored in, for example, the storage region such as the memory 802 or the recording medium 805 illustrated in FIG. 8.

The second storage unit 1310 stores information for managing an executed task. The second storage unit 1310 stores, for example, the queue state DB 900 illustrated in FIG. 9. The second storage unit 1310 stores an executed task. The second storage unit 1310 stores, for example, the task execution queue 1000 illustrated in FIG. 10. The second storage unit 1310 stores processing target data used for a task. The second storage unit 1310 stores, for example, the data management DB 1100 illustrated in FIG. 11. Consequently, each functional unit can refer to the storage content of the various DBs of the second storage unit 1310 in a process therein.

The second acquisition unit 1311 acquires an execution order securing request for adding an idle task to the task execution queue 1000. The second acquisition unit 1311 receives the execution order securing request from the task deployment apparatus 100. Consequently, the second acquisition unit 1311 can secure an execution order of new tasks generated in the future in the task execution queue 1000.

The second acquisition unit 1311 receives a replacement request for replacing an idle task in the task execution queue 1000 with a new task. For example, the second acquisition unit 1311 receives the replacement request from the task deployment apparatus 100. Consequently, the second acquisition unit 1311 can execute new tasks according to the secured execution order.

The execution unit 1312 extracts and executes a task in the task execution queue 1000. The execution unit 1312 extracts a task from the task execution queue 1000, completes execution of the extracted task, and then extracts the next task from the task execution queue 1000. Consequently, the execution unit 1312 can secure an execution order of tasks.

The execution unit 1312 adds an idle task to the task execution queue 1000 in a case where the second acquisition unit 1311 acquires the execution order securing request. Consequently, the execution unit 1312 can secure an execution order of new tasks generated in the future in the task execution queue 1000.

In a case where the second acquisition unit 1311 acquires the replacement request, the execution unit 1312 replaces the idle task in the task execution node 110 with a new task. Consequently, the second acquisition unit 1311 can execute new tasks according to the secured execution order.

The second output unit 1313 outputs the storage content of the queue state DB 900 in response to an inquiry from the task deployment apparatus 100. An output form is, for example, display on a display, printing output to a printer, transmission to an external apparatus using the network I/F 803, or storage in the storage region such as the memory 802 or the recording medium 805. The external apparatus is, for example, the task deployment apparatus 100. The second output unit 1313 may output an execution result in the execution unit 1312 in response to an execution request from the task deployment apparatus 100. The second output unit 1313 may output a processing result in each functional unit.

Specific Functional Configuration Examples of Task Deployment Apparatus 100 and Task Execution Node 110

Next, with reference to FIG. 14, a description will be made of specific functional configuration examples of the task deployment apparatus 100 and the task execution node 110.

Figure 14:
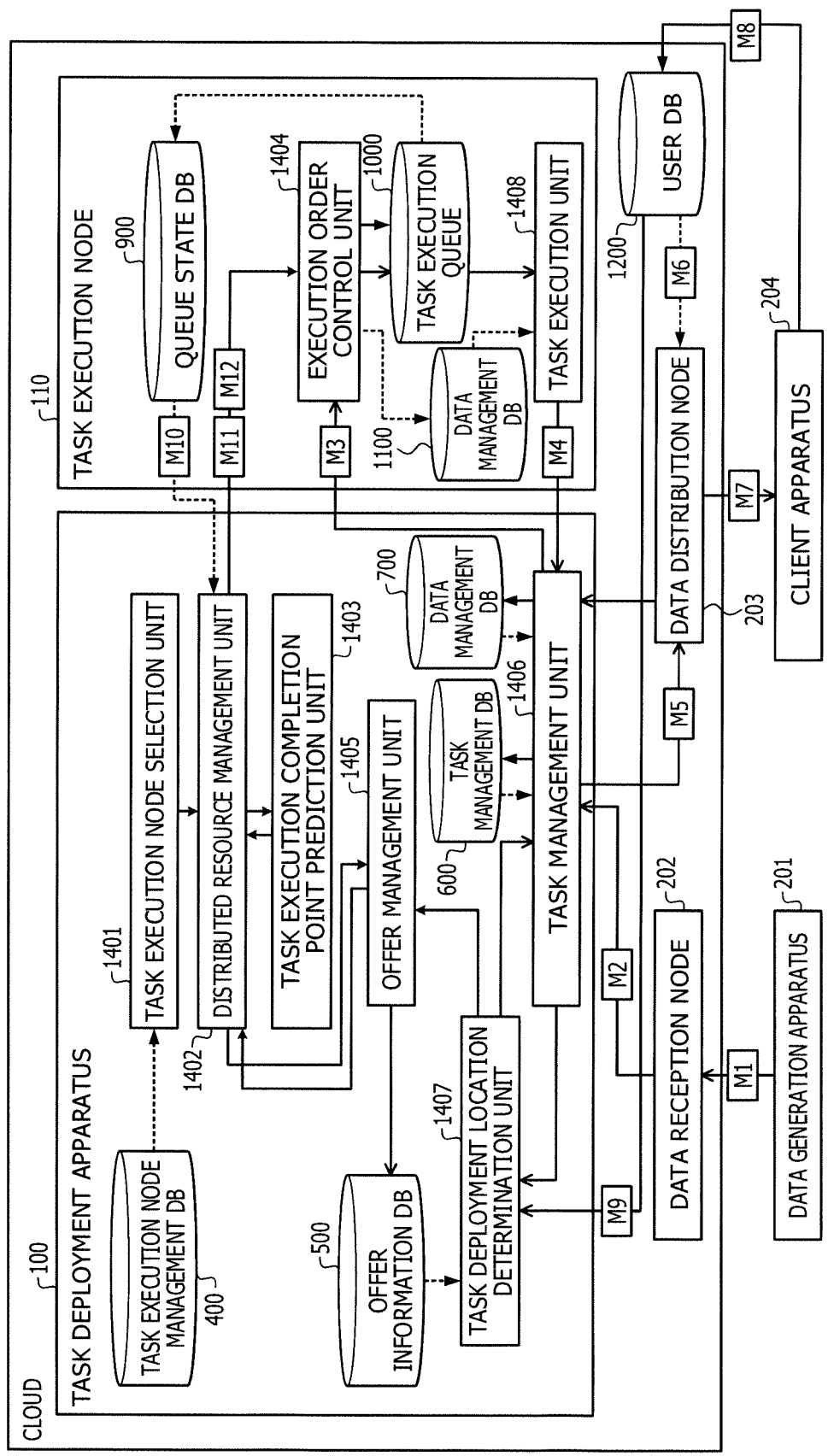
FIG. 14 is an explanatory diagram illustrating specific functional configuration examples of the task deployment apparatus and the task execution node.

FIG. 14 is an explanatory diagram illustrating specific functional configuration examples of the task deployment apparatus 100 and the task execution node 110. The task deployment apparatus 100 has the task execution node management DB 400 illustrated in FIG. 4, the offer information DB 500 illustrated in FIG. 5, the task management DB 600 illustrated in FIG. 6, and the data management DB 700 illustrated in FIG. 7.

The task deployment apparatus 100 includes a task execution node selection unit 1401, a distributed resource management unit 1402, a task execution completion point prediction unit 1403, an offer management unit 1405, a task management unit 1406, and a task deployment location determination unit 1407.

On the other hand, the task execution node 110 has the queue state DB 900 illustrated in FIG. 9, the task execution queue 1000 illustrated in FIG. 10, and the data management DB 1100 illustrated in FIG. 11. The task execution node 110 includes an execution order control unit 1404 and a task execution unit 1408.

The task execution node selection unit 1401 refers to the task execution node management DB 400 so as to select the task execution node 110 which is inquired about the number of tasks in the task execution queue 1000. The task execution node selection unit 1401 outputs the selected task execution node 110 to the distributed resource management unit 1402.

The distributed resource management unit 1402 transmits an inquiry about the number of tasks in the task execution queue 1000 corresponding to any CPU 801 of the task execution node 110 to the selected task execution node 110. The distributed resource management unit 1402 receives a tenth message M10 indicating the storage content of the queue state DB 900. An example of the tenth message M10 will be described later in, for example, FIG. 24.

The distributed resource management unit 1402 causes the task execution completion point prediction unit 1403 to calculate a task execution completion point in a case where any CPU 801 of the selected task execution node 110 executes a new task. The distributed resource management unit 1402 receives the task execution completion point from the task execution completion point prediction unit 1403, and outputs the task execution completion point to the offer management unit 1405.

The distributed resource management unit 1402 transmits an eleventh message M11 for an execution order securing request to the execution order control unit 1404 of the task execution node 110 including any CPU 801 based on the task execution completion point. The execution order securing request is a request for adding an idle task to the task execution queue 1000 storing a task executed by any CPU 801. An example of the eleventh message M11 will be described later in, for example, FIG. 25.

The distributed resource management unit 1402 transmits a twelfth message M12 for a deletion request for deleting an idle task. An example of the twelfth message M12 will be described later in, for example, FIG. 26. Consequently, the distributed resource management unit 1402 can secure an execution order of new tasks. The distributed resource management unit 1402 may delete an idle task which is not replaced with a new task from the task execution queue 1000.

The task execution completion point prediction unit 1403 calculates a task execution completion time in a case where any CPU 801 executes a new task, and calculates a task execution completion point at which the task execution completion time elapses from the present time. The task execution completion point prediction unit 1403 outputs the task execution completion point to the distributed resource management unit 1402.

The offer management unit 1405 stores offer information including the task execution completion point by using the offer information DB 500. Consequently, the offer management unit 1405 can manage the CPU 801 of the task execution node 110 which can execute a new task, and can manage a task execution completion point in a case where the CPU 801 of the task execution node 110 executes the new task.

The data generation apparatus 201 transmits a first message M1 as input data to the data reception node 202. The first message M1 will be described later in, for example, FIG. 15. The data reception node 202 transmits the first message M1 to the task management unit 1406 as a second message M2.

If the eleventh message M11 for an execution order securing request is received, the execution order control unit 1404 adds an idle task to the task execution queue 1000. If the twelfth message M12 for a deletion request is received, the execution order control unit 1404 deletes an idle task from the task execution queue 1000. If a third message M3 for a replacement request for replacing an idle task in the task execution queue 1000 with a new task is received, the execution order control unit 1404 replaces an idle task in the task execution queue 1000 with a new task. An example of the third message M3 will be described later in, for example, FIG. 17.

The task management unit 1406 receives input data from the data reception node 202. The task management unit 1406 stores the input data by using the data management DB 700. The task management unit 1406 generates a new task based on the input data. The task management unit 1406 stores task management information for the new task by using the task management DB 600. In a case where the new task is generated, the task management unit 1406 transmits a request for determining a deployment location of the new task to the task deployment location determination unit 1407.

The task deployment location determination unit 1407 determines a deployment location of the new task by referring to the offer information DB 500. The task deployment location determination unit 1407 determines the CPU 801 in which the task execution completion point is closest to the present time as a deployment location according to, for example, a response delay minimization algorithm. For example, the task deployment location determination unit 1407 may refer to the user DB 1200 so as to determine the CPU 801 in which the task execution completion point is earlier than a deadline as a deployment location according to a deadline satisfaction ratio maximization algorithm. The task deployment location determination unit 1407 may separately use the response delay minimization algorithm and the deadline satisfaction ratio maximization algorithm by referring to the user DB 1200.

The task execution unit 1408 sequentially extracts task management information from the task execution queue 1000, and executes a task by referring to the data management DB 1100. The task execution unit 1408 transmits a fourth message M4 to the task management unit 1406 as a result of the task by using the CPU 801. An example of the fourth message M4 will be described later in, for example, FIG. 18.

The data distribution node 203 transmits the fourth message M4 from the task execution unit 1408 via the task management unit 1406 as a fifth message M5. An example of the fifth message M5 will be described later in, for example, FIG. 19. The data distribution node 203 acquires a sixth message M6 as user information from the user DB 1200, and transmits the sixth message M6 to the task management unit 1406. An example of the sixth message M6 will be described later in, for example, FIG. 20. The data distribution node 203 transmits the fifth message M5 received from the task management unit 1406 to the client apparatus 204 as a seventh message M7. An example of the seventh message M7 will be described later in, for example, FIG. 21.

The client apparatus 204 receives the seventh message M7 as an execution result of a task. The client apparatus 204 receives a deadline for a task through a user's input operation. The client apparatus 204 inputs an eighth message M8 indicating the deadline to the user DB 1200. The eighth message M8 will be described later in, for example, FIG. 22. The user information in the user DB 1200 is input to the task deployment location determination unit 1407 as a ninth message M9. The ninth message M9 will be described later in, for example, FIG. 23.

Example of First Message M1

Here, with reference to FIGS. 15 to 26, a description will be made of examples of various messages which are transmitted and received between each unit of the task deployment apparatus 100 and each unit of the task execution node 110 illustrated in FIG. 14. First, with reference to FIG. 15, a description will be made of an example of the first message M1.

FIG. 15 is an explanatory diagram illustrating an example of the first message M1. As illustrated in FIG. 15, the first message M1 includes, for example, a transmission source address, a destination address, and input data. The input data is data having any format. The first message M1 is transmitted from the data generation apparatus 201 to the data reception node 202.

Example of Second Message M2

Next, with reference to FIG. 16, a description will be made of an example of the second message M2.

FIG. 16 is an explanatory diagram illustrating an example of the second message M2. As illustrated in FIG. 16, the second message M2 includes, for example, a transmission source address, a destination address, and input data. The input data is data having any format. The second message M2 is transmitted from the data reception node 202 to the task deployment apparatus 100.

Example of Third Message M3

Next, with reference to FIG. 17, a description will be made of an example of the third message M3.

FIG. 17 is an explanatory diagram illustrating an example of the third message M3. As illustrated in FIG. 17, the third message M3 includes, for example, a transmission source address, a destination address, a task ID, and processing target data. The task ID is an ID for specifying a task which is to be executed by the task execution node 110. The processing target data is data having any format. The third message M3 is transmitted from the task deployment apparatus 100 to the task execution node 110.

Example of Fourth Message M4

Next, with reference to FIG. 18, a description will be made of an example of the fourth message M4.

FIG. 18 is an explanatory diagram illustrating an example of the fourth message M4. As illustrated in FIG. 18, the fourth message M4 includes, for example, a transmission source address, a destination address, a task ID, and execution result data. The task ID is an ID for specifying a task which is to be executed by the task execution node 110. The execution result data is data having any format. The fourth message M4 is transmitted from the task execution node 110 to the task deployment apparatus 100.

Example of Fifth Message M5

Next, with reference to FIG. 19, a description will be made of an example of the fifth message M5.

FIG. 19 is an explanatory diagram illustrating an example of the fifth message M5. As illustrated in FIG. 19, the fifth message M5 includes, for example, a transmission source address, a destination address, a task ID, and execution result data. The task ID is an ID for specifying a task which is to be executed by the task execution node 110. The execution result data is data having any format. The fifth message M5 is transmitted from task management unit 1406 to the data distribution node 203.

Example of Sixth Message M6

Next, with reference to FIG. 20, a description will be made of an example of the sixth message M6.

FIG. 20 is an explanatory diagram illustrating an example of the sixth message M6. As illustrated in FIG. 20, the sixth message M6 includes, for example, a transmission source address, a destination address, a task ID, and a user address. The task ID is an ID for specifying a task which is to be executed by the task execution node 110. The user address is an address indicating the client apparatus 204 to which a task execution result is transmitted. The sixth message M6 is acquired by the data distribution node 203 from the user DB 1200.

Example of Seventh Message M7

Next, with reference to FIG. 21, a description will be made of an example of the seventh message M7.

FIG. 21 is an explanatory diagram illustrating an example of the seventh message M7. As illustrated in FIG. 21, the seventh message M7 includes, for example, a transmission source address, a destination address, a task ID, and execution result data. The task ID is an ID for specifying a task which is to be executed by the task execution node 110. The execution result data is data having any format. The seventh message M7 is transmitted from the data distribution node 203 to the client apparatus 204.

Example of Eighth Message M8

Next, with reference to FIG. 22, a description will be made of an example of the eighth message M8.

FIG. 22 is an explanatory diagram illustrating an example of the eighth message M8. As illustrated in FIG. 22, the eighth message M8 includes, for example, a transmission source address, a destination address, a task ID, and a constraint condition. The task ID is an ID for specifying a task which is to be executed by the task execution node 110.

The constraint condition includes, for example, a request algorithm and a request time. The request algorithm or a deadline satisfaction ratio maximization algorithm or a response delay minimization algorithm. The deadline satisfaction ratio maximization algorithm is an algorithm for allocating a task to the CPU 801 which can complete a task by the deadline. The response delay minimization algorithm is an algorithm for allocating a task to the CPU 801 in which a task execution completion point is closest to the present time or a task execution completion point is the minimum. The request time is a deadline indicating a time limit by which a task execution result is to be transmitted. The eighth message M8 is input to the user DB 1200 from the client apparatus 204.

Example of Ninth Message M9

Next, with reference to FIG. 23, a description will be made of an example of the ninth message M9.

FIG. 23 is an explanatory diagram illustrating an example of the ninth message M9. As illustrated in FIG. 23, the ninth message M9 includes, for example, a transmission source address, a destination address, a task ID, and a constraint condition. The task ID is an ID for specifying a task which is to be executed by the task execution node 110.

The constraint condition includes, for example, a request algorithm and a request time. The request algorithm or a deadline satisfaction ratio maximization algorithm or a response delay minimization algorithm. The deadline satisfaction ratio maximization algorithm is an algorithm for allocating a task to the CPU 801 which can complete a task by the deadline. The response delay minimization algorithm is an algorithm for allocating a task to the CPU 801 in which a task execution completion point is closest to the present time or a task execution completion point is the minimum. The request time is a deadline indicating a time limit by which a task execution result is to be transmitted. The ninth message M9 is input to the task deployment apparatus 100 from the user DB 1200.

Example of Tenth Message M10

Next, with reference to FIG. 24, a description will be made of an example of the tenth message M10.

FIG. 24 is an explanatory diagram illustrating an example of the tenth message M10. As illustrated in FIG. 24, the tenth message M10 includes, for example, a transmission source address, a destination address, and a queue state. The queue state includes, for example, a task execution node ID, the number of existing tasks, and an average process execution rate. The task execution node ID is an ID for specifying the task execution node 110. The number of existing tasks is the number of existing tasks from the head to a vacancy of the task execution queue 1000 included in the task execution node 110 indicated by the task execution node ID. The average process execution rate is an average process execution rate of all tasks executed in the past by the task execution node 110 indicated by the task execution node ID. The tenth message M10 is transmitted from the task execution node 110 to the task deployment apparatus 100.

Example of Eleventh Message M11

Next, with reference to FIG. 25, a description will be made of an example of the eleventh message M11.

FIG. 25 is an explanatory diagram illustrating an example of the eleventh message M11. As illustrated in FIG. 25, the eleventh message M11 includes, for example, a transmission source address, a destination address, and execution order securing. The execution order securing includes, for example, a task execution node ID. The task execution node ID is an ID for specifying the task execution node 110 in which an idle task is added to the task execution queue 1000, and an execution order of new tasks generated in the future. The eleventh message M11 is transmitted from the task deployment apparatus 100 to the task execution node 110.

Example of Twelfth Message M12

Next, with reference to FIG. 26, a description will be made of an example of the twelfth message M12.

FIG. 26 is an explanatory diagram illustrating an example of the twelfth message M12. As illustrated in FIG. 26, the twelfth message M12 includes, for example, a transmission source address, a destination address, and execution order release. The execution order release includes, for example, a task execution node ID and a task ID. The task execution node ID is an ID for specifying the task execution node 110 in which an idle task is added to the task execution queue 1000. The task ID is an ID for specifying an idle task deleted from the task execution queue 1000. The twelfth message M12 is transmitted from the task deployment apparatus 100 to the task execution node 110.

Flow of Determining Task Deployment Location

Next, with reference to FIG. 27, a description will be made of a flow of determining a task deployment location.

Figure 27:
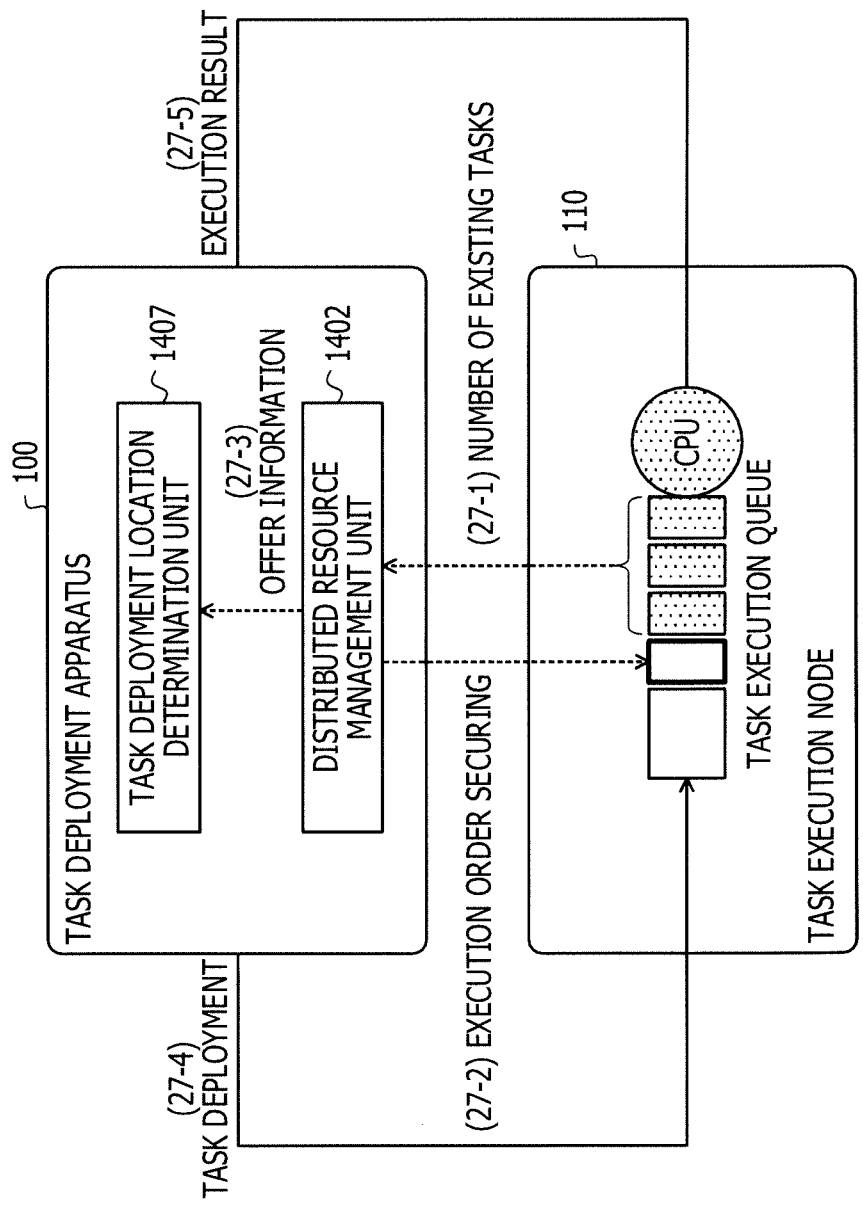
FIG. 27 is an explanatory diagram illustrating a flow of determining a task deployment location.

FIG. 27 is an explanatory diagram illustrating a flow of determining a task deployment location. In FIG. 27, (27-1) the distributed resource management unit 1402 receives the current number of tasks in the task execution queue 1000 storing a task executed by the CPU 801 of the task execution node 110 as an offer issued by the task execution node 110.

(27-2) The distributed resource management unit 1402 transmits an execution order securing request for adding an idle task to the task execution queue 1000 storing a task executed by any CPU 801 of the task execution node 110, to the task execution node 110. Consequently, the distributed resource management unit 1402 can add an idle task which can be replaced with a new task generated in the future, to the task execution queue 1000 storing a task executed by the CPU 801 of the task execution node 110. The distributed resource management unit 1402 can secure an execution order of new tasks generated in the future.

(27-3) The distributed resource management unit 1402 transmits offer information regarding an offer issued by the task execution node 110 and including a task execution completion point based on the number of tasks, to the task deployment location determination unit 1407.

(27-4) The task deployment location determination unit 1407 receives the offer information from the distributed resource management unit 1402. In a case where a new task is generated, the task deployment location determination unit 1407 determines the CPU 801 which becomes a deployment location of the new task based on the offer information. The task deployment location determination unit 1407 transmits an execution request for the new task to the task execution node 110 including the determined CPU 801.

(27-5) In a case where the execution request is received, the task execution node 110 replaces the idle task in the task execution queue 1000 with the new task. The task execution node 110 sequentially extracts tasks in the task execution queue 1000 and executes the tasks. The task execution node 110 transmits execution results of the tasks to the task deployment apparatus 100. Consequently, the task deployment apparatus 100 can deploy a new task to a CPU which appears to complete execution of a new task by a predetermined time limit.

Here, for example, there is a case where the task execution node 110 includes a single CPU 801, the task deployment apparatus 100 source randomly selects the task execution node 110 as an offer issue, and a task processing amount is uniform. This case corresponds to Example 1 which will be described later.

For example, there is a case where the task execution node 110 includes a single CPU 801, the task deployment apparatus 100 selects the task execution node 110 in which the number of tasks is relatively small as an offer issue source, and a task processing amount is uniform. This case corresponds to Example 2 which will be described later.

For example, there is a case where the task execution node 110 includes a single CPU 801, the task deployment apparatus 100 selects the task execution node 110 as an offer issue source randomly, and a task processing amount is not uniform. This case corresponds to Example 3 which will be described later.

For example, there is a case where the task execution node 110 includes a plurality of CPUs 801, the task deployment apparatus 100 randomly selects the task execution node 110 as an offer issue source, and a task processing amount is uniform. This case corresponds to Example 4 which will be described later.

Example 1 of Determining Deployment Location

Next, with reference to FIGS. 28 to 31, a description will be made of Example 1 of determining a deployment location.

Figure 28:
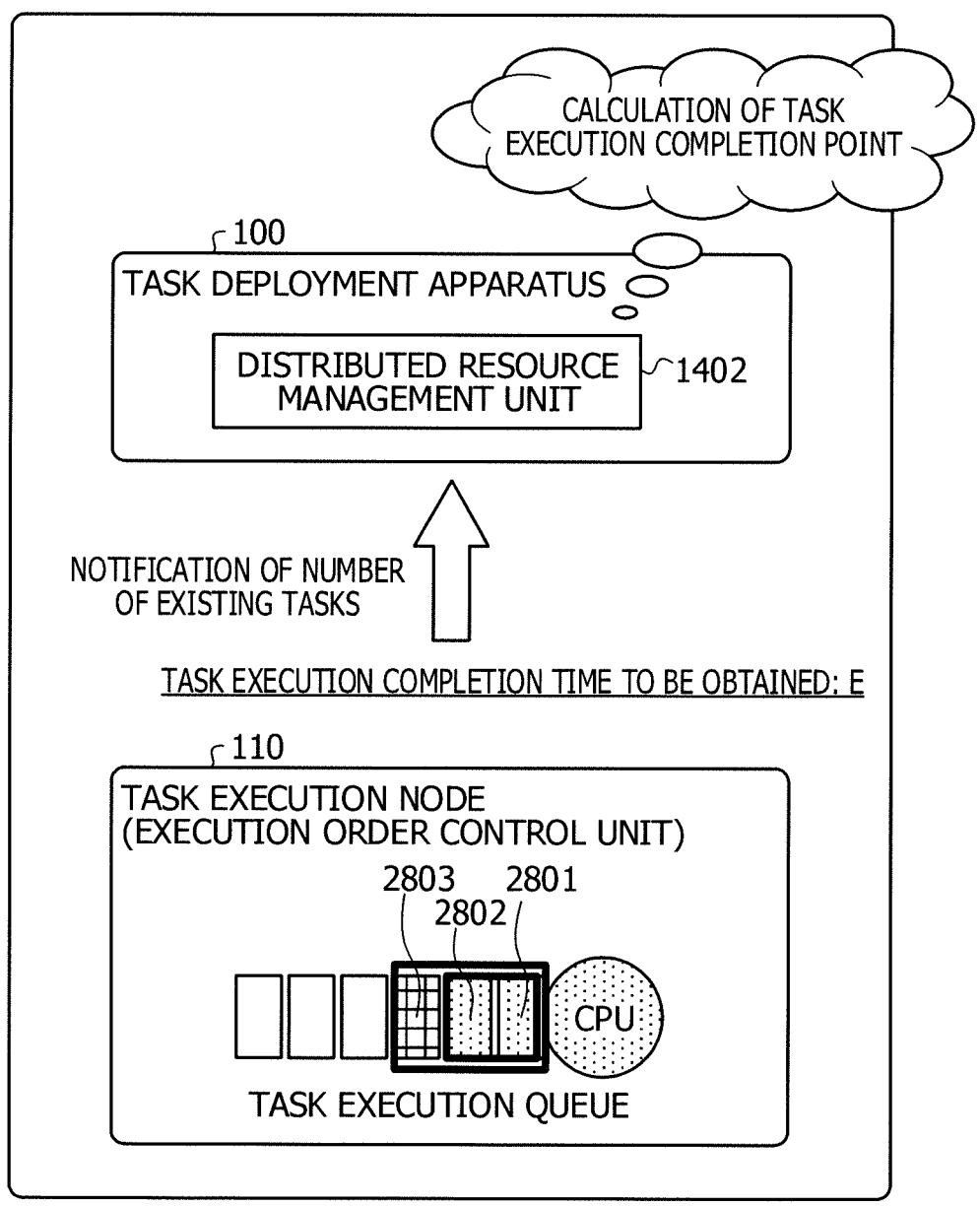
FIG. 28 is an explanatory diagram (first) illustrating Example 1 of determining a deployment location.

FIGS. 28 to 31 are explanatory diagrams illustrating Example 1 of determining a deployment location. In FIG. 28, the distributed resource management unit 1402 refers to the task execution node management DB 400, and randomly selects the task execution node 110 as an offer issue source. Since the task execution node 110 includes a single CPU 801, the distributed resource management unit 1402 may not perform the selection in the unit of the CPU 801.

The distributed resource management unit 1402 selects a task execution node 110A. The distributed resource management unit 1402 receives a notification of the number of existing tasks K=2 as the number of tasks 2801 and 2802 stored in the task execution queue 1000 from the execution order control unit 1404 of the selected task execution node 110A, and stores the number of existing tasks in the queue state DB 900.

The distributed resource management unit 1402 adds 1 to the number of existing tasks K=2, and thus calculates the number of tasks K+1=3 in the task execution queue 1000, including a new task 2803 which is generated in the future and is added to the task execution queue 1000. The distributed resource management unit 1402 refers to the queue state DB 900, and calculates a task execution completion time $E=(K+1)/\mu$ based on the number of tasks K+1 and an average process execution rate $\mu$ in the CPU 801. The distributed resource management unit 1402 calculates a task execution completion point after the task execution completion time E elapses from the present time. Here, the description will be continued with reference to FIG. 29.

Figure 29:
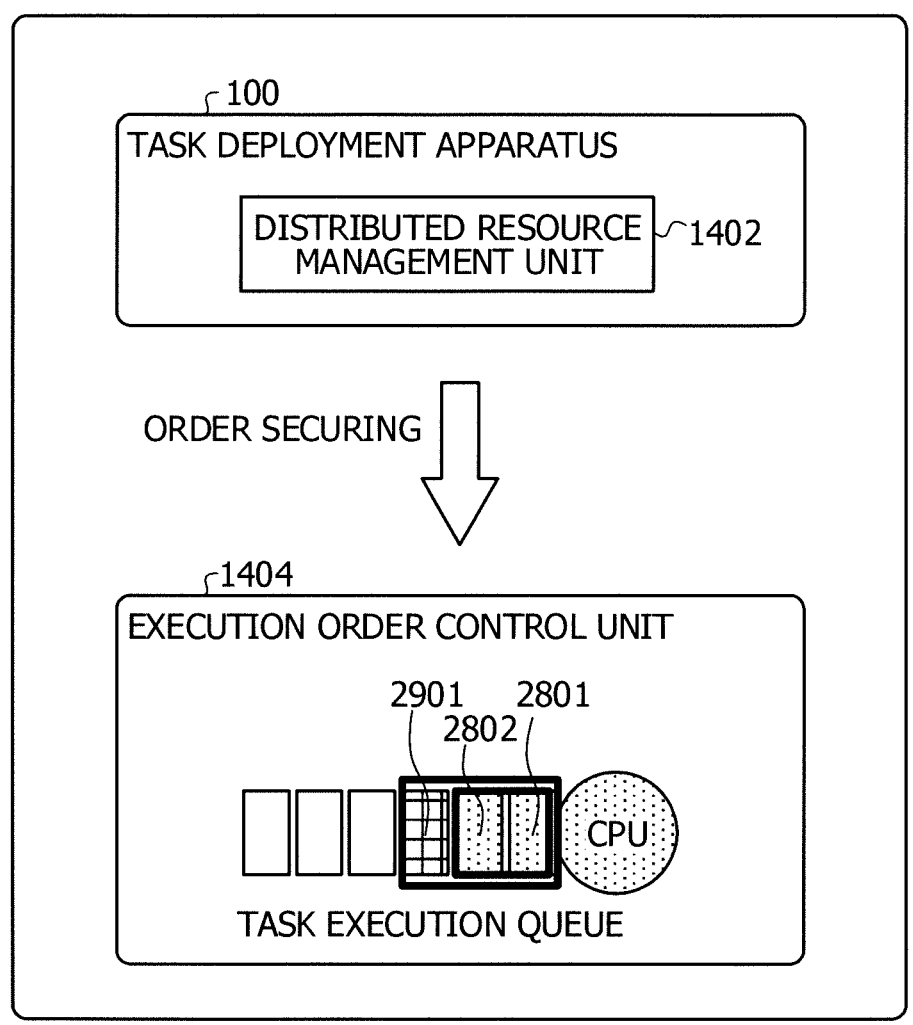
FIG. 29 is an explanatory diagram (second) illustrating Example 1 of determining a deployment location.

In FIG. 29, the distributed resource management unit 1402 transmits an execution order securing request to the execution order control unit 1404. In a case where the execution order securing request is received, the execution order control unit 1404 adds an idle task 2901 to the task execution queue 1000. The execution order control unit 1404 adds a record in which an ID for specifying the idle task 2901 and NULL as processing target data are set to the task execution queue 1000. Here, the description will be continued with reference to FIG. 30.

Figure 30:
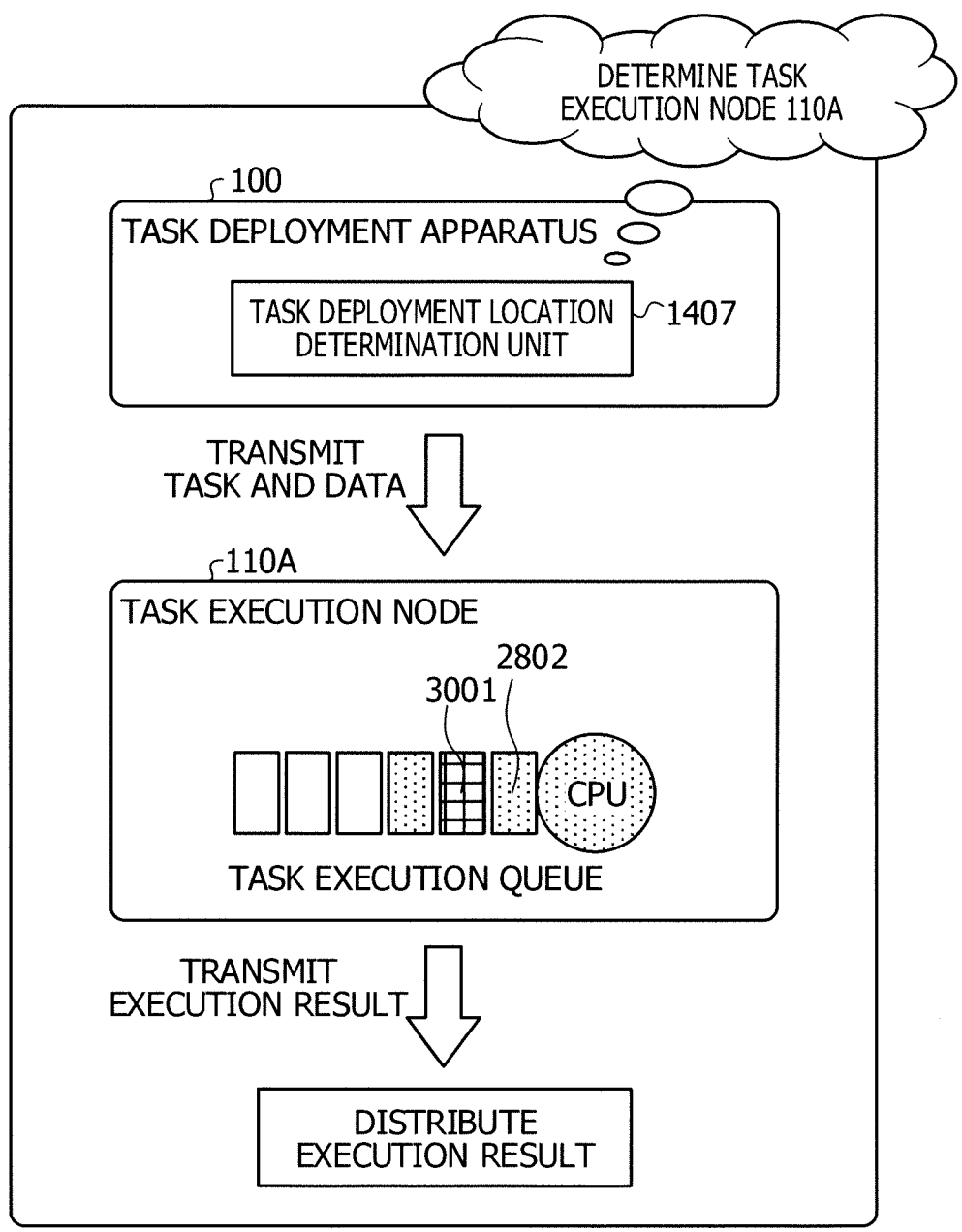
FIG. 30 is an explanatory diagram (third) illustrating Example 1 of determining a deployment location.

In FIG. 30, the task deployment location determination unit 1407 determines the task execution node 110A as a deployment location of a generated new task 3001 according to the response delay minimization algorithm or the deadline satisfaction ratio maximization algorithm. The task deployment location determination unit 1407 transmits a correlation between the generated new task 3001 and processing target data to the task execution node 110A.

Here, the task execution node 110A has completed execution of the task 2801. In a case where the new task 3001 and the processing target data are received, the task execution node 110A replaces the idle task 2901 in the task execution queue 1000 with the new task 3001. The task execution node 110A sequentially extracts the tasks 2802 and 3001 from the task execution queue 1000, executes the tasks, and transmits execution results thereof to the task deployment apparatus 100. Consequently, the execution result of the new task 3001 is distributed to the client apparatus 204 via the task deployment apparatus 100 or the data distribution node 203. Here, the description will be continued with reference to FIG. 31.

Figure 31:
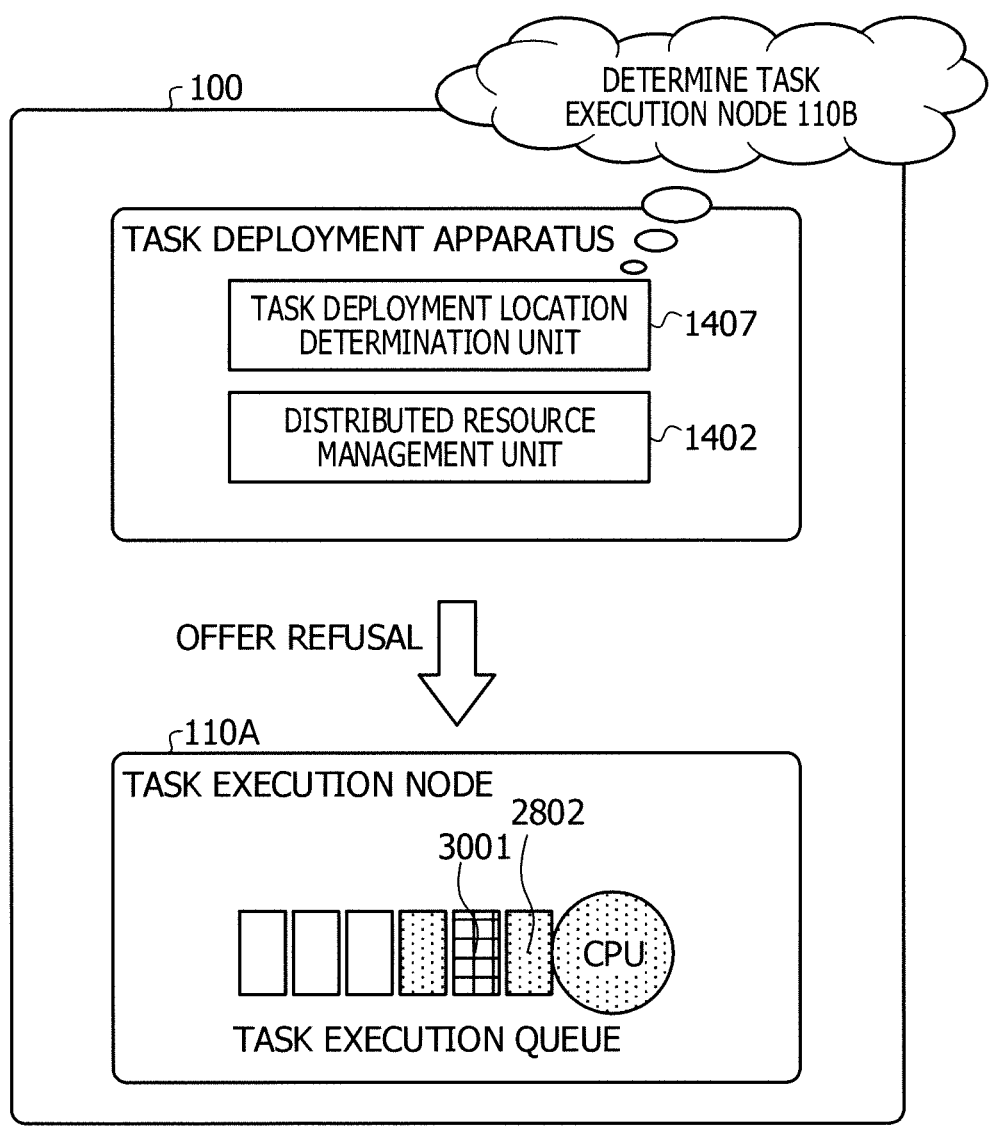
FIG. 31 is an explanatory diagram (fourth) illustrating Example 1 of determining a deployment location.

In FIG. 31, the task deployment location determination unit 1407 may determine a task execution node 110B as a deployment location of the generated new task 3001 according to the response delay minimization algorithm or the deadline satisfaction ratio maximization algorithm. The task deployment location determination unit 1407 transmits an offer refusal notification to the task execution node 110A.

Here, in a case where the offer refusal notification is received, the task execution node 110A deletes the idle task 2901 from the task execution queue 1000. Consequently, the task execution node 110A can suppress a calculation resource or power consumption from being wasted due to execution of the idle task 2901.

Example of Distributed Resource Management Process Procedure in Example 1

Next, with reference to FIG. 32, a description will be made of a distributed resource management process procedure in Example 1, executed by the task deployment apparatus 100.

Figure 32:
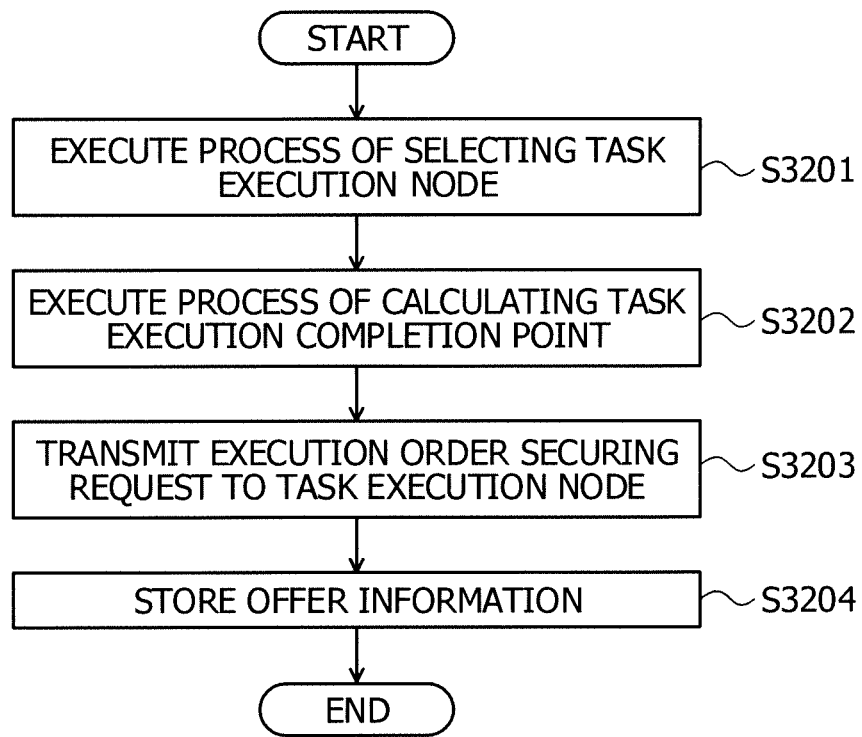
FIG. 32 is a flowchart illustrating an example of a distributed resource management process procedure in Example 1.

FIG. 32 is a flowchart illustrating an example of a distributed resource management process procedure in Example 1. In FIG. 32, the task deployment apparatus 100 refers to the task execution node management DB 400, and executes a process of selecting the task execution node 110 (step S3201). Next, the task deployment apparatus 100 refers to the queue state DB 900, and executes a process of calculating a task execution completion point (step S3202). The task deployment apparatus 100 transmits an execution order securing request to the task execution node 110, so as to cause task execution node 110 to execute an execution order securing process (step S3203).

Next, the task deployment apparatus 100 stores offer information by using the offer information DB 500 (step S3204). The task deployment apparatus 100 finishes the distributed resource management process procedure. Consequently, the task deployment apparatus 100 can specify the task execution node 110 which can execute a task.

Example of Deployment Location Determination Process Procedure in Example 1

Next, with reference to FIG. 33, a description will be made of an example of a deployment location determination process procedure in Example 1, executed by the task deployment apparatus 100.

Figure 33:
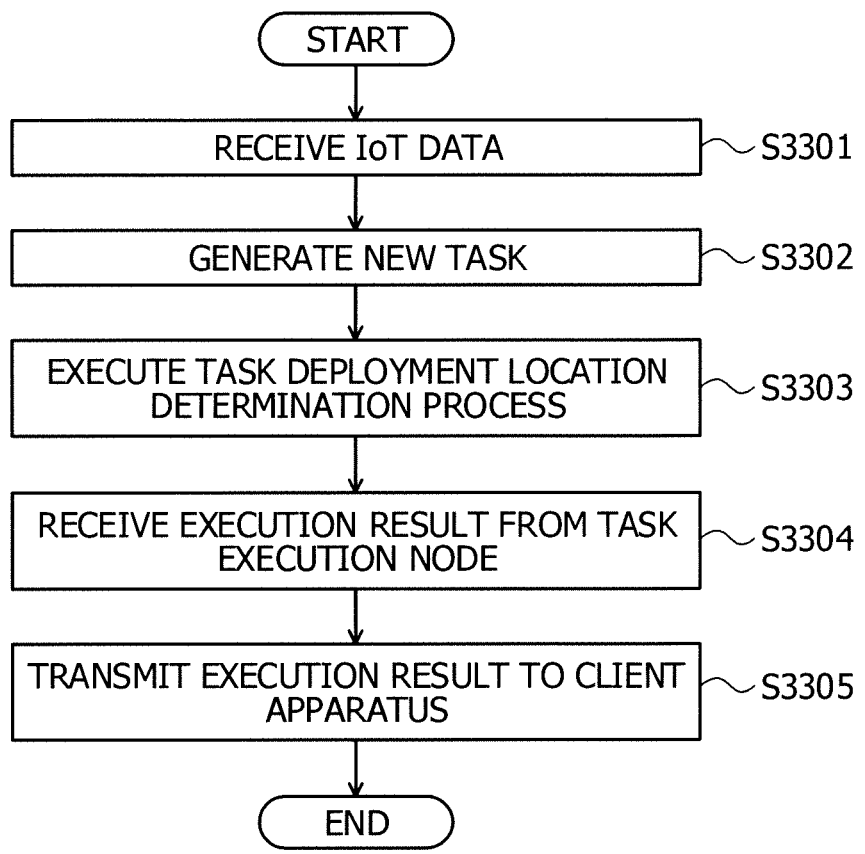
FIG. 33 is a flowchart illustrating an example of a deployment location determination process procedure in Example 1.

FIG. 33 is a flowchart illustrating an example of a deployment location determination process procedure in Example 1. In FIG. 33, the task deployment apparatus 100 receives IoT data (step S3301). Next, the task deployment apparatus 100 generates a new task based on the received IoT data (step S3302). The task deployment apparatus 100 refers to the offer information DB 500, and executes a deployment location determination process on the generated new task (step S3303).

Next, the task deployment apparatus 100 receives an execution result from the task execution node 110 (step S3304). The task deployment apparatus 100 transmits the execution result to the client apparatus 204 (step S3305). Thereafter, the task deployment apparatus 100 finishes the deployment location determination process. Consequently, the task deployment apparatus 100 can cause the task execution node 110 to execute a task.

Example of Selection Process Procedure for Task Execution Node 110 in Example 1

Next, with reference to FIG. 34, a description will be made of an example of a selection process procedure for the task execution node 110, executed by the task deployment apparatus 100 in step S3201.

Figure 34:
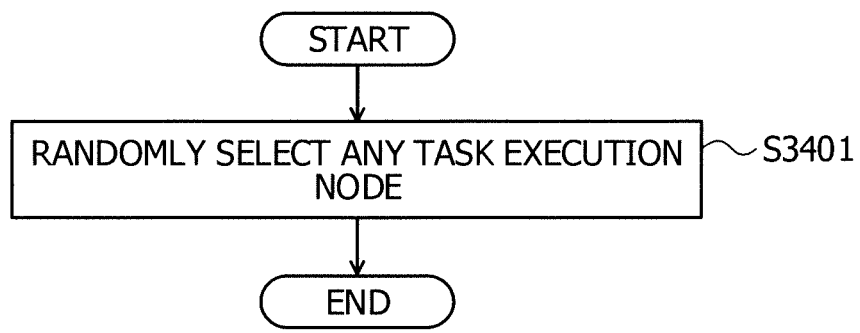
FIG. 34 is a flowchart illustrating an example of a task execution node selection process procedure in Example 1.

FIG. 34 is a flowchart illustrating a selection process procedure for the task execution node 110 in Example 1. In FIG. 34, the task deployment apparatus 100 refers to the task execution node management DB 400, and randomly selects any task execution node 110 among a plurality of task execution nodes 110 of the task deployment system 200 (step S3401). The task deployment apparatus 100 finishes the selection process procedure for the task execution node 110.

Example of Task Execution Completion Point Calculation Process Procedure in Example 1

Next, with reference to FIG. 35, a description will be made of an example of a task execution completion point calculation process procedure in Example 1, executed by the task deployment apparatus 100 in step S3202.

Figure 35:
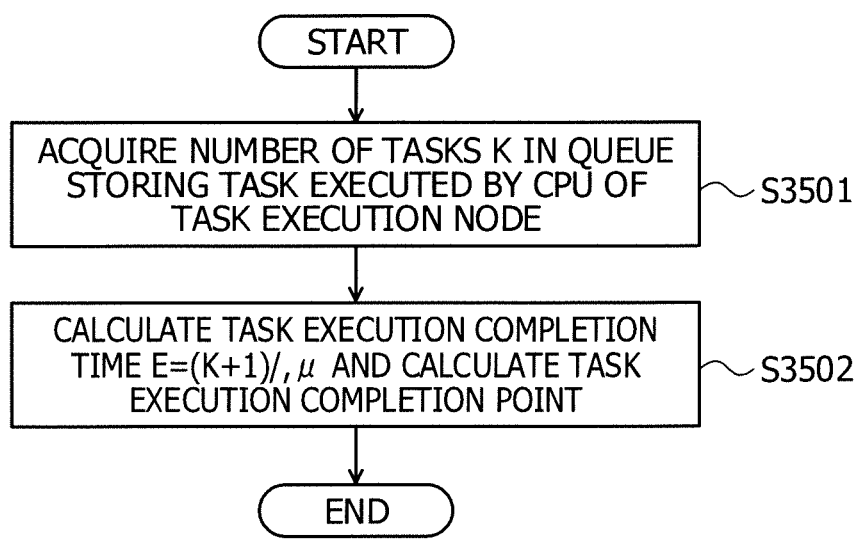
FIG. 35 is a flowchart illustrating an example of a task execution completion point calculation process procedure in Example 1.

FIG. 35 is a flowchart illustrating a task execution completion point calculation process procedure in Example 1. In FIG. 35, the task deployment apparatus 100 refers to the queue state DB 900, and acquires the number of tasks K in the task execution queue 1000 storing a task executed by the CPU 801 of the selected task execution node 110 (step S3501).

Next, the task deployment apparatus 100 refers to the queue state DB 900, and calculates a task execution completion time $E=(K+1)/\mu$ based on the number of tasks K+1 and the average process execution rate $\mu$ in the CPU 801 so as to calculate a task execution completion point (step S3502). The task deployment apparatus 100 finishes the task execution completion point calculation process.

Example of Execution Order Securing Process Procedure in Example 1

Next, with reference to FIG. 36, a description will be made of an example of an execution order securing process procedure in Example 1, executed by the task execution node 110 in step S3203.

Figure 36:
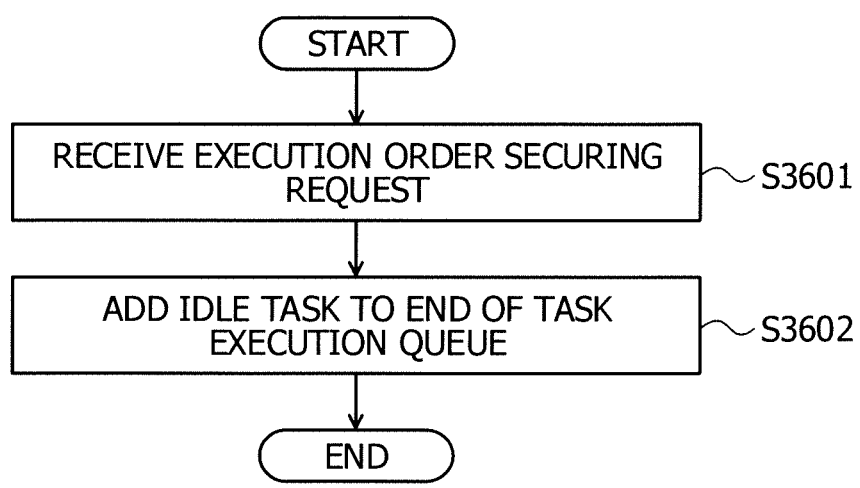
FIG. 36 is a flowchart illustrating an example of an execution order securing process procedure in Example 1.

FIG. 36 is a flowchart illustrating an example of an execution order securing process procedure in Example 1. In FIG. 36, the task execution node 110 receives an execution order securing request (step S3601). Next, the task execution node 110 adds an idle task to the end of the task execution queue 1000 (step S3602). The task execution node 110 finishes the execution order securing process.

Example of Task Deployment Location Determination Process Procedure in Example 1

Next, with reference to FIG. 37, a description will be made of an example of a task deployment location determination process procedure in Example 1, executed by the task deployment apparatus 100 in step S3303.

Figure 37:
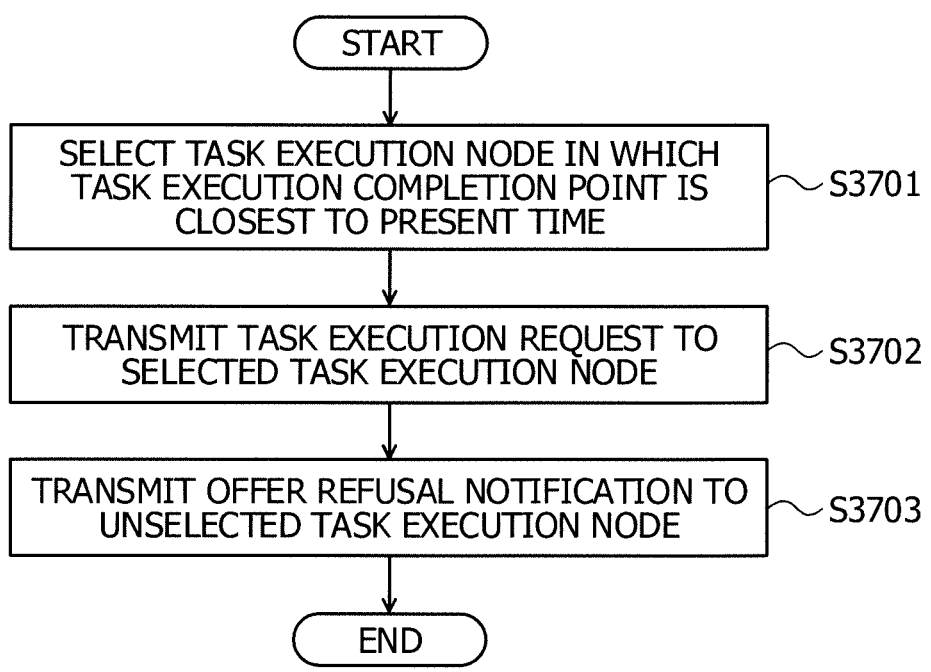
FIG. 37 is a flowchart illustrating an example of a task deployment location determination process procedure in Example 1.

FIG. 37 is a flowchart illustrating an example of a task deployment location determination process procedure in Example 1. In FIG. 37, the task deployment apparatus 100 refers to the offer information DB 500, and selects the task execution node 110 in which the task execution completion point is closest to the present time (step S3701).

Next, the task deployment apparatus 100 transmits a task execution request to the selected task execution node 110 (step S3702). On the other hand, the task deployment apparatus 100 transmits an offer refusal notification to the task execution node 110 which is not selected (step S3703). The task deployment apparatus 100 finishes the task deployment location determination process.

Another Example of Task Deployment Location Determination Process Procedure in Example 1

Next, with reference to FIG. 38, a description will be made of another example of a task deployment location determination process procedure in Example 1, executed by the task deployment apparatus 100 in step S3303.

Figure 38:
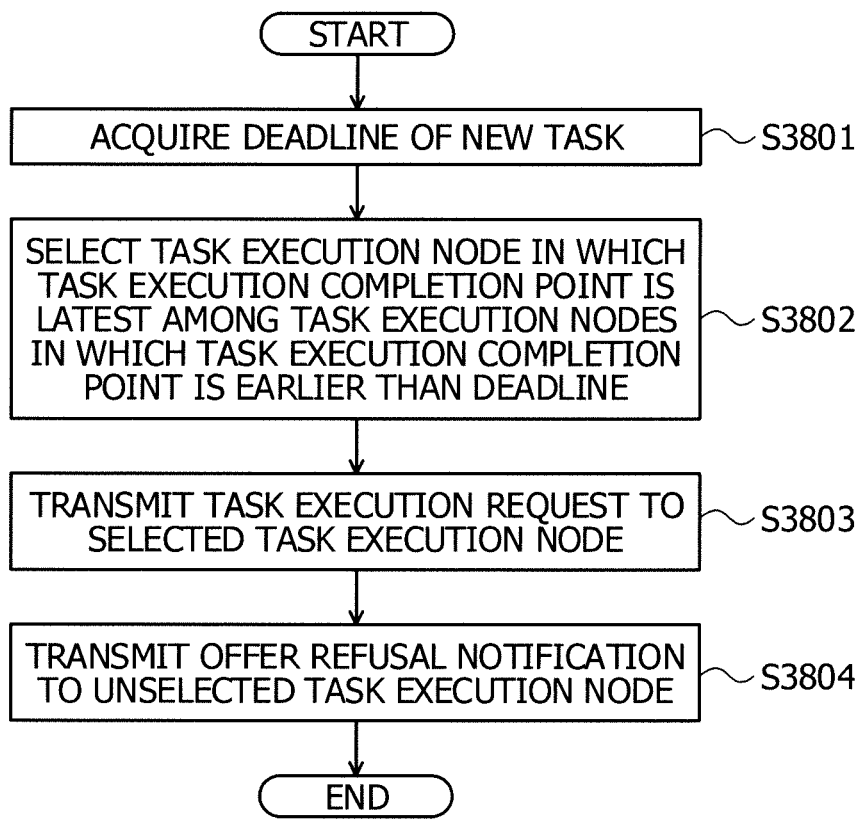
FIG. 38 is a flowchart illustrating another example of a task deployment location determination process procedure in Example 1.

FIG. 38 is a flowchart illustrating another example of a task deployment location determination process procedure in Example 1. In FIG. 38, the task deployment apparatus 100 refers to the user DB 1200, and acquires a deadline of the generated new task (step S3801).

Next, the task deployment apparatus 100 refers to the offer information DB 500, and selects the task execution node 110 in which the task execution completion point is latest among the task execution nodes 110 in which the task execution completion point is earlier than the deadline (step S3802).

The task deployment apparatus 100 transmits a task execution request to the selected task execution node 110 (step S3803). On the other hand, the task deployment apparatus 100 transmits an offer refusal notification to the task execution node 110 which is not selected (step S3804). The task deployment apparatus 100 finishes the task deployment location determination process.

The task deployment apparatus 100 may selectively use the task deployment location determination process illustrated in FIG. 37 and the task deployment location determination process illustrated in FIG. 38 by referring to the user DB 1200. Consequently, the task deployment apparatus 100 can control a task execution completion point according to a criterion requested by a user.

Example of Offer Success Process Procedure in Example 1

Next, with reference to FIG. 39, a description will be made of an example of an offer success process procedure in Example 1, executed by the task execution node 110.

Figure 39:
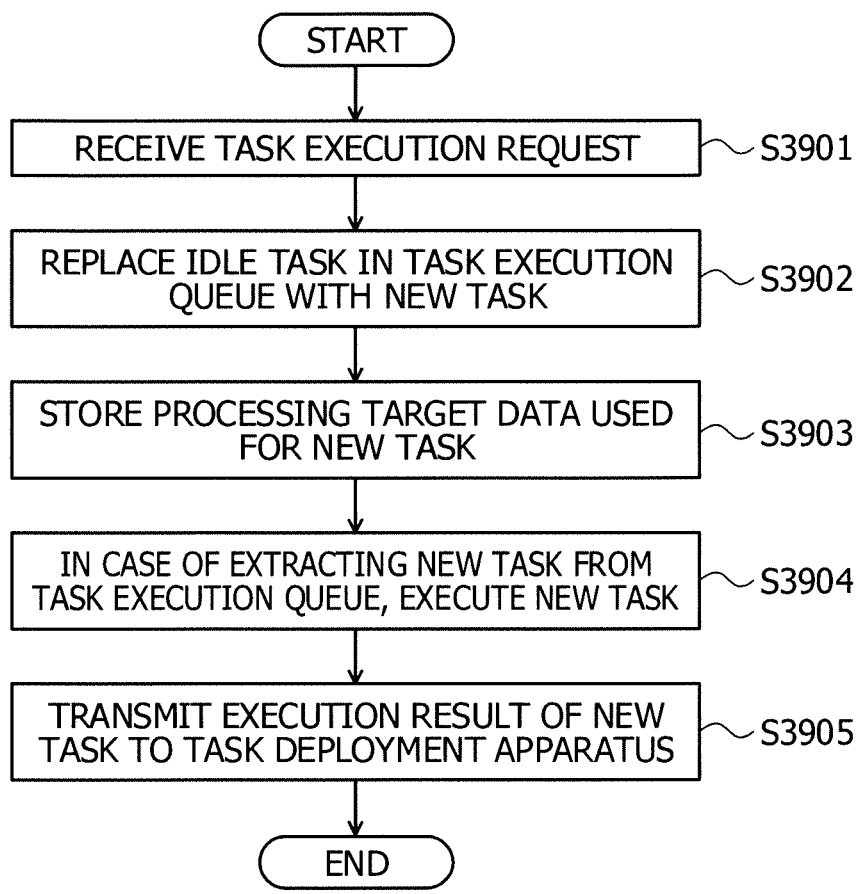
FIG. 39 is a flowchart illustrating an example of an offer success process procedure in Example 1.

FIG. 39 is a flowchart illustrating an example of an offer success process procedure in Example 1. In FIG. 39, the task execution node 110 receives a task execution request (step S3901).

Next, the task execution node 110 replaces an idle task in the task execution queue 1000 with a new task corresponding to the task execution request (step S3902). The task execution node 110 stores processing target data used for the new task by using the data management DB 1100 (step S3903).

Thereafter, in a case where the new task is extracted from the task execution queue 1000, the task execution node 110 executes the new task by using the processing target data (step S3904). Next, the task execution node 110 transmits an execution result of the new task to the task deployment apparatus 100 (step S3905). The task execution node 110 finishes the offer success process.

Example of Offer Failure Process Procedure in Example 1

Next, with reference to FIG. 40, a description will be made of an example of an offer failure process procedure in Example 1, executed by the task execution node 110.

Figure 40:
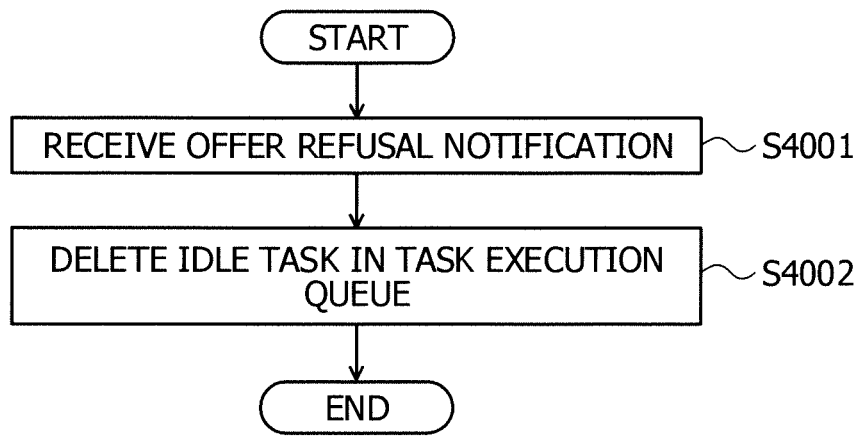
FIG. 40 is a flowchart illustrating an example of an offer failure process procedure in Example 1.

FIG. 40 is a flowchart illustrating an example of an offer success process procedure in Example 1. In FIG. 40, the task execution node 110 receives an offer refusal notification (step S4001).

Next, the task execution node 110 deletes an idle task in the task execution queue 1000 (step S4002). The task execution node 110 finishes the offer failure process.

Example 2 of Determining Deployment Location

Next, a description will be made of Example 2 of determining a deployment location. In Example 1, as described above, a description has been made of a case where the distributed resource management unit 1402 randomly selects the task execution node 110 as an offer issue source.

In contrast, in Example 2, the distributed resource management unit 1402 acquires the number of existing tasks K in the task execution queue 1000 of each of a plurality of task execution nodes 110. The distributed resource management unit 1402 selects the task execution node 110 of which the acquired number of existing tasks K is relatively small as an offer issue source. Since the task execution node 110 includes a single CPU 801, the distributed resource management unit 1402 may not perform the selection in the unit of the CPU 801.

Thereafter, in the same manner as in Example 1, the distributed resource management unit 1402 calculates the task execution completion time E, calculates a task execution completion point, and performs operations as illustrated in FIGS. 29 to 31, with respect to the selected task execution node 110, and thus a description thereof will be omitted.

Example of Selection Process Procedure for Task Execution Node 110 in Example 2

Next, with reference to FIG. 41, a description will be made of an example of a selection process procedure for the task execution node 110, executed by the task deployment apparatus 100 in step S3201 in Example 2.

Figure 41:
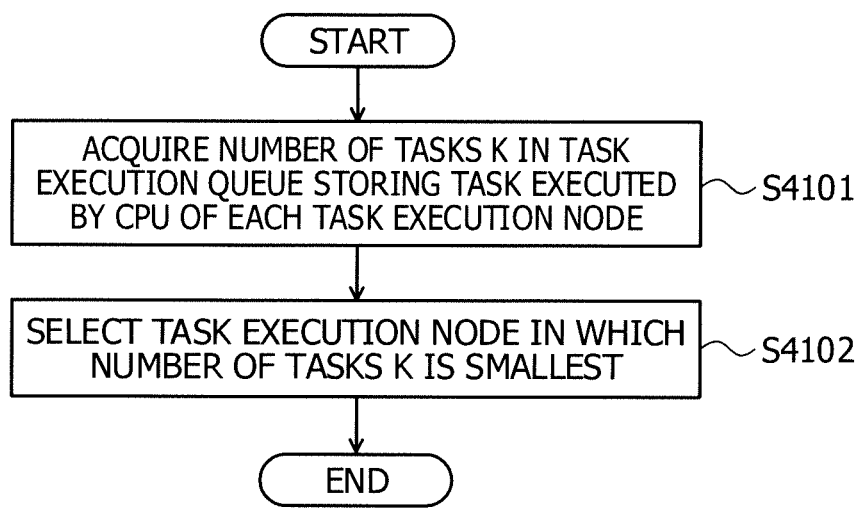
FIG. 41 is a flowchart illustrating an example of a task execution node selection process procedure in Example 2.

FIG. 41 is a flowchart illustrating a selection process procedure for the task execution node 110 in Example 2. In FIG. 41, the task deployment apparatus 100 acquires the number of tasks K in the task execution queue 1000 storing a task executed by the CPU 801 of each of a plurality of task execution nodes 110 (step S4101).

Next, the task deployment apparatus 100 selects the task execution node 110 in which the number of tasks K is smallest (step S4102). The task deployment apparatus 100 finishes the process of selecting the task execution node 110. Consequently, the task deployment apparatus 100 can select the task execution node 110 in which a probability of executing a task is relatively high.

Example 3 of Determining Deployment Location

Next, with reference to FIG. 42, a description will be made of Example 3 of determining a deployment location.

Figure 42:
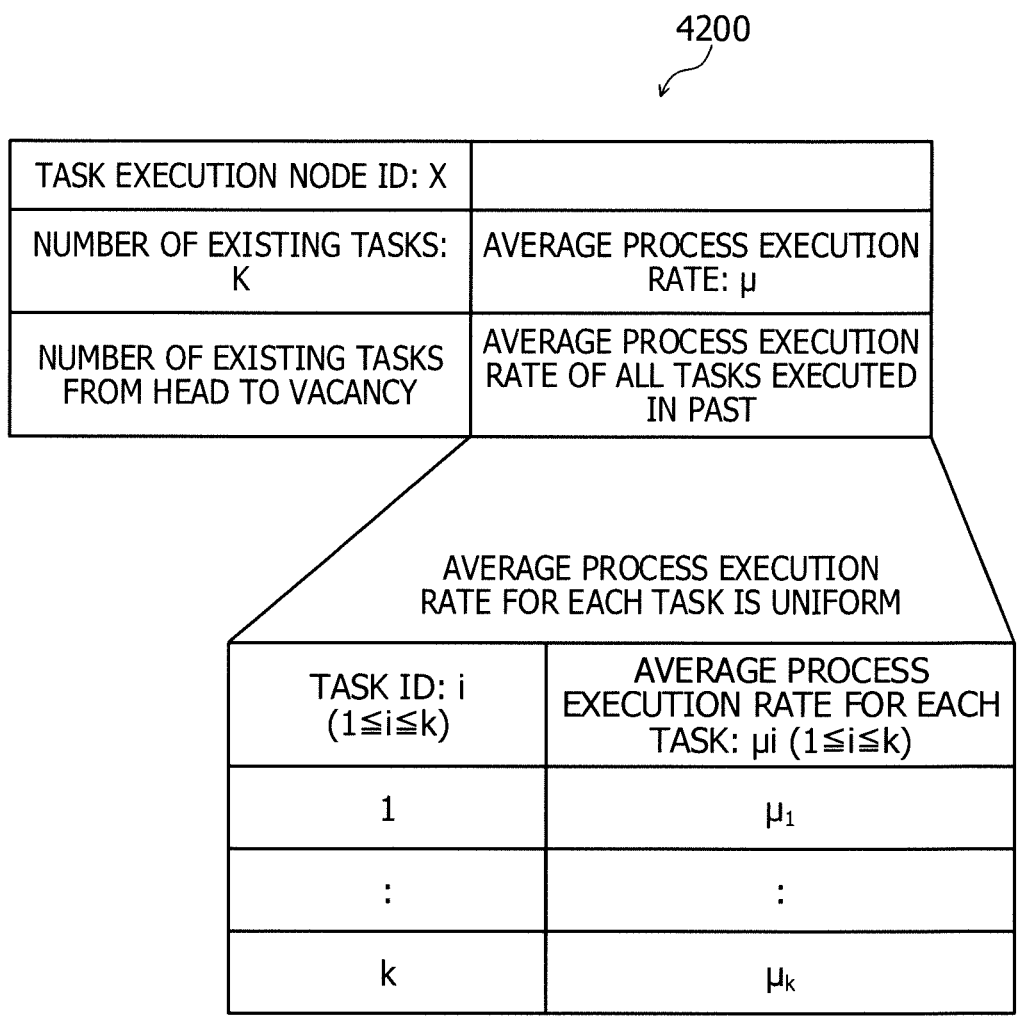
FIG. 42 is an explanatory diagram illustrating an example of the storage content of a queue state DB in Example 3.

FIG. 42 is an explanatory diagram illustrating an example of the storage content of a queue state DB 4200 in Example 3. In Example 3, unlike Example 1, the queue state DB 4200 stores an average process execution rate $\mu_i$ for each type of task in correlation with a field of an average process execution rate A task ID is an ID for specifying the type of task.

In Example 1, a description has been made of a case where the distributed resource management unit 1402 calculates the task execution completion time E by using an average process execution rate of all tasks executed in the past regardless of the type of task, and calculates a task execution completion point.

In contrast, in Example 3, the distributed resource management unit 1402 estimates the type of task for specifying the type of new task which is generated in the future and is added to the task execution queue 1000, and specifies a task ID corresponding to the type of task. The estimation is performed based on, for example, the content of input data received from the data generation apparatus 201 in the past. The distributed resource management unit 1402 refers to the queue state DB 4200, calculates a task execution completion time $E_i=(K+1)/\mu_i$ based on the number of tasks K+1 and the average process execution rate $\mu_i$ corresponding to the specified task ID, and calculates a task execution completion point.

Example of Task Execution Completion Point Calculation Process Procedure in Example 3

Next, with reference to FIG. 43, a description will be made of an example of a task execution completion point calculation process procedure in Example 3, executed by the task deployment apparatus 100 in step S3202.

Figure 43:
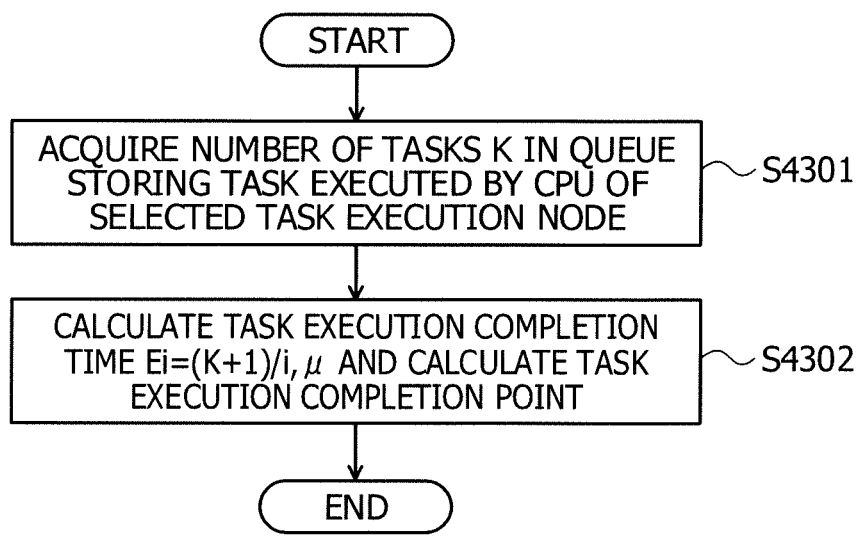
FIG. 43 is a flowchart illustrating an example of a task execution completion point calculation process procedure in Example 3.

FIG. 43 is a flowchart illustrating a task execution completion point calculation process procedure in Example 3. In FIG. 43, the task deployment apparatus 100 refers to the queue state DB 4200, and acquires the number of tasks K in the task execution queue 1000 storing a task executed by the CPU 801 of the selected task execution node 110 (step S4301).

Next, the task deployment apparatus 100 calculates the task execution completion time $E_i=(K+1)/\mu_i$ based on the number of tasks K+1 and the average process execution rate $\mu_i$ in the CPU 801 corresponding to the type of task, and calculates a task execution completion point (step S4302). The task deployment apparatus 100 finishes the task execution completion point calculation process.

Example 4 of Determining Deployment Location

Next, with reference to FIGS. 44 and 45, a description will be made of Example 4 of determining a deployment location.

Figure 44:
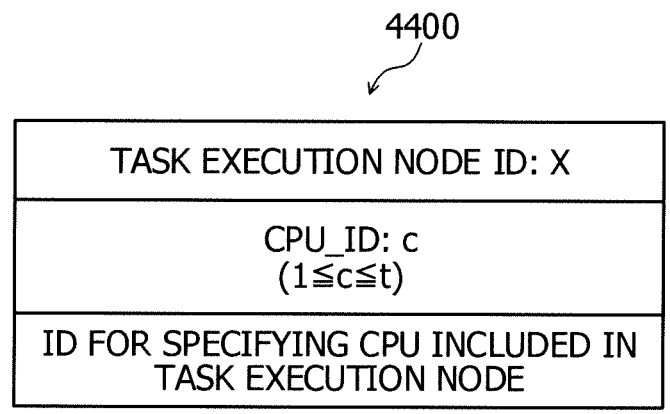
FIG. 44 is an explanatory diagram illustrating an example of the storage content of a task execution node management DB in Example 4.

FIG. 44 is an explanatory diagram illustrating an example of the storage content of a task execution node management DB 4400 in Example 4. In Example 4, unlike Example 1, the task execution node management DB 4400 has fields of a task execution node ID and a CPU_ID.

A task execution node ID is set in the field of a task execution node ID. The task execution node ID is an ID for specifying the task execution node 110. The task execution node ID is, for example, X. X is an integer of 1 to k. Here, k is the number of task execution nodes 110 in the task deployment system 200. A CPU_ID is set in the field of a CPU_ID. The CPU_ID is an ID for specifying the CPU 801 of the task execution node 110 indicated by the task execution node ID. The CPU_ID is, for example, c. Here, c is an integer of 1 to t. Here, t is the number of CPUs 801 of the task execution node 110.

Figure 45:
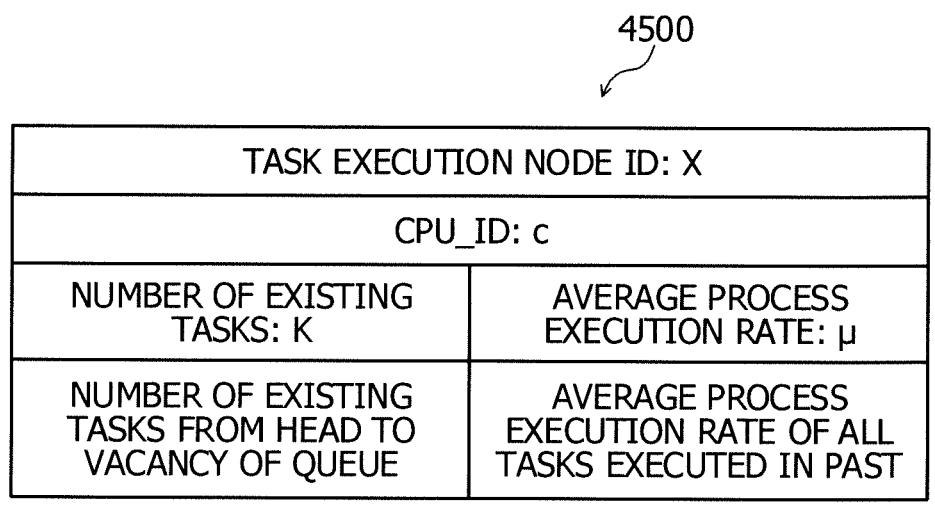
FIG. 45 is an explanatory diagram illustrating an example of the storage content of a queue state DB in Example 4.

FIG. 45 is an explanatory diagram illustrating an example of the storage content of a queue state DB 4500 in Example 4. In Example 4, unlike Example 1, the queue state DB 4500 has fields of a CPU_ID, the number of existing tasks, and an average process execution rate in correlation with a field of a task execution node ID.

A task execution node ID is set in the field of a task execution node ID. The task execution node ID is an ID for specifying the task execution node 110 storing the queue state DB 4500. The task execution node ID is, for example, X. X is an integer of 1 to k. Here, k is the number of task execution nodes 110 in the task deployment system 200. A CPU_ID is set in the field of a CPU_ID. The CPU_ID is an ID for specifying the CPU 801 of the task execution node 110 indicated by the task execution node ID. The CPU_ID is, for example, c. Here, c is an integer of 1 to t. Here, t is the number of CPUs 801 of the task execution node 110.

The number of existing tasks is set in the field of the number of existing tasks. The number of existing tasks is the number of existing tasks from the head to a vacancy of the task execution queue 1000 corresponding to the CPU 801 indicated by the CPU_ID. An average process execution rate is set in the field of an average process execution rate. The average process execution rate is an average process execution rate of all tasks executed by the CPU 801 indicated by the CPU_ID in the past.

In Example 1, a description has been made of a case where the distributed resource management unit 1402 selects an offer issue source in the unit of the task execution node 110, calculates the task execution completion time E in the unit of the task execution node 110, and calculates a task execution completion point.

In contrast, in Example 4, the distributed resource management unit 1402 selects any task execution node 110 as an offer issue source from among a plurality of task execution nodes 110 by referring to the task execution node management DB 4400. The distributed resource management unit 1402 selects any CPU 801 included in the selected task execution node 110 as an execution destination of a new task.

The distributed resource management unit 1402 receives a notification of the number of existing tasks K as the number of tasks stored in the task execution queue 1000 corresponding to the selected CPU 801 from the execution order control unit 1404 of the selected task execution node 110, and stores the number of existing tasks in the queue state DB 4500.

The distributed resource management unit 1402 adds 1 to the number of existing tasks K, and thus calculates the number of tasks K+1 in the task execution queue 1000, including a new task which is generated in the future and is added to the task execution queue 1000. The distributed resource management unit 1402 refers to the queue state DB 4500, calculates a task execution completion time $E=(K+1)/\mu$ based on the number of tasks K+1 and an average process execution rate $\mu$ in the CPU 801, and calculates a task execution completion point.

In Example 4, all CPUs 801 included in any task execution node 110 can complete execution of a task by a deadline, the task deployment apparatus 100 may transmit a task execution request without specifying the CPU 801.

Example 5 of Determining Deployment Location

In Example 4, a description has been made of a case where the task execution queue 1000 is prepared in the unit of the CPU 801, and the CPU 801 executes a task in the task execution queue 1000 corresponding to the CPU 801.

In contrast, in Example 5, the task execution queue 1000 is prepared in the unit of the task execution node 110, and one or more CPUs 801 included in the task execution node 110 share and execute tasks in the task execution queue 1000.

In this case, the distributed resource management unit 1402 refers to the task execution node management DB 400, and selects any task execution node 110 as an offer issue source from among a plurality of task execution nodes 110.

The distributed resource management unit 1402 receives a notification of the number of existing tasks K as the number of tasks stored in the task execution queue 1000 from the execution order control unit 1404 of the selected task execution node 110, and stores the number of existing tasks in the queue state DB 900.

The distributed resource management unit 1402 adds 1 to the number of existing tasks K, and thus calculates the number of tasks K+1 in the task execution queue 1000, including a new task which is generated in the future and is added to the task execution queue 1000.

Here, there is a case where an average process execution rate of each CPU 801 included in the task execution node 110 is uniform. In this case, the distributed resource management unit 1402 calculates an average process execution rate $\mu'=n\mu$ in the entire task execution node 110 based on average process execution rates $\mu$ in the CPUs 801 included in the task execution node 110 and the number n of CPUs 801 included in the task execution node 110. The distributed resource management unit 1402 refers to the queue state DB 4500, calculates a task execution completion time $E=(K+1)/\mu'$ based on the number of tasks K+1 and the average process execution rate $\mu'$, and calculates a task execution completion point.

There is a case where average process execution rates of the CPUs 801 included in the task execution node 110 are different from each other. In this case, the distributed resource management unit 1402 may calculate a task execution completion point based on an average process execution rate $\mu_n$ in each CPU 801 and the number of tasks K+1.

As described above, according to the task deployment apparatus 100, the number of processes in a queue storing a process executed by the calculation device included in any task execution node 110 among one or more task execution nodes 110 may be acquired at a predetermined interval. According to the task deployment apparatus 100, an execution completion point for a new process in a case where a calculation device is to execute the new process may be calculated for each calculation device based on the acquired number of processes in the calculation device and a process execution rate in the calculation device. According to the task deployment apparatus 100, a calculation device included in any node 110 may be determined among one or more nodes 110 as a calculation device which is to execute a new process based on an execution completion point calculated for each calculation device. Consequently, the task deployment apparatus 100 can deploy a new task to a CPU which appears to complete execution of a process by a predetermined time limit. Since the task deployment apparatus 100 acquires the number of processes in a queue before a new process is generated, and calculates an execution completion point for the new process, it is possible to reduce time from generation of the new process until the new process is executed by the node 110.

According to the task deployment apparatus 100, in a case where the number of processes in a queue storing a process executed by a calculation device is acquired, a dummy process may be added to the queue storing the process executed by the calculation device in the node 110 including the calculation device. According to the task deployment apparatus 100, in a case where a calculation device which is to execute a new process is determined, a dummy process added to a queue storing a process executed by the calculation device may be replaced with the new process in the node 110 including the calculation device which is to execute the new process. Consequently, the task deployment apparatus 100 can execute a new process in an order secured in advance, and can thus reduce time from generation of the new process until execution of the new process is completed.

According to the task deployment apparatus 100, the number of processes in a queue storing a process executed by a calculation device which is randomly selected from among a plurality of calculation devices included in one or more nodes 110 may be acquired at a predetermined interval. Consequently, the task deployment apparatus 100 can reduce a communication amount in the whole of one or more nodes 110.

According to the task deployment apparatus 100, the number of processes in a queue storing a process executed by each of a plurality of calculation devices included in one or more nodes 110 may be acquired at a predetermined interval. According to the task deployment apparatus 100, a dummy process may be added to a queue storing a process executed by a calculation device in the node 110 including the calculation device in which a relatively small number of processes is acquired among a plurality of calculation devices. Consequently, the task deployment apparatus 100 can select a calculation device in which a probability of executing a new process generated in the future is high and time from generation of a new process generated in the future until execution of the new process is completed is relatively short, and can a dummy process thereto. Thus, the task deployment apparatus 100 can make it difficult for a calculation device which wastefully uses a calculation resource or the like without executing a new process although a dummy process is added to occur.

According to the task deployment apparatus 100, an execution request for a new process, including a transmission time limit for an execution result of the new process may be received. According to the task deployment apparatus 100, as a calculated which is to execute the new process, a calculation device in which a calculated execution completion point is earlier than the transmission time limit included in the received execution request may be determined. Consequently, the task deployment apparatus 100 can improve a probability that execution of a new process may be completed by a deadline.

According to the task deployment apparatus 100, as a calculated which is to execute the new process, a calculation device in which a calculated execution completion point is closest to the present time may be determined. Consequently, the task deployment apparatus 100 can minimize time to acquire an execution result of a new process, and can thus improve a probability that execution of the new process may be completed by a deadline.

According to the task deployment apparatus 100, an execution completion point for a new process may be calculated for each calculation device based on the acquired number of processes in a calculation device, and a process execution rate corresponding to the type of new process among process execution rates in calculation devices for the respective types of processes. Consequently, the task deployment apparatus 100 can calculate an execution completion point for a new process with high accuracy in a case where the type of new process.

According to the task deployment apparatus 100, the number of processes in a queue storing a process executed by a calculation device included in any node 110 among one or more nodes 110, and a process execution rate in the calculation device may be acquired at a predetermined interval. Consequently, the task deployment apparatus 100 can update a process execution rate in a calculation device to the latest state.

The task deployment method described in the present embodiment may be realized by executing a program prepared in advance in a computer such as a personal computer or a workstation. The task deployment program described in the present embodiment is recorded on a computer readable recording medium such as a hard disk, a flexible disk, a CD-ROM, an MO, or a DVD, and is executed as a result of being read from the recording medium by a computer. The task deployment program described in the present embodiment may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A task deployment method executed by a processor of a task development apparatus, the task development method comprising:
   acquiring, at a predetermined interval, a number of processes in a queue that stores the processes executed by a plurality of calculation devices included in at least one of one or more nodes until a timing at which a new process to be executed occurs;
   setting, for each of the plurality of calculation devices, a process execution rate through communication with the plurality of calculation devices;
   calculating, for each of the plurality of calculation devices, an execution completion point for the new process in a case where the new process is started by dividing the acquired number of processes in the queue by the determined process execution rate for each of the respective calculation devices;
   determining, from among the plurality of calculation devices, a calculation device that completes execution of the new process by a predetermined time limit, based on the execution completion point calculated for each of the plurality of calculation devices;
   causing the at least one of one or more nodes to add a dummy process to the queue when the number of processes is acquired; and
   when the calculation device to execute the new process is determined, causing the determined calculation device to execute a process for replacing the new process with the dummy process.

2. The task deployment method according to claim 1, wherein the acquiring includes acquiring, at the predetermined interval, the number of processes in the queue that stores the processes executed by calculation devices randomly selected from among a plurality of calculation devices included in the one or more nodes.

3. The task deployment method according to claim 1, wherein
   the acquiring includes acquiring, at the predetermined interval, the number of processes in the queue that stores the processes executed by each of a plurality of calculation devices included in the one or more nodes, and
   the causing the at least one of one or more nodes to add the dummy process includes causing a node that includes a calculation device that acquired a relatively small number of processes among the plurality of calculation devices to add the queue that stores processes related to the relatively small number of processes.

4. The task deployment method according to claim 1, further comprises
   receiving an execution request for the new process that includes a transmission time limit for an execution result of the new process,
   wherein the determining includes determining a calculation device in which the calculated execution completion point is earlier than the transmission time limit included in the received execution request as the calculation device to execute the new process.

5. The task deployment method according to claim 1, wherein the determining includes determining a calculation device in which the calculated execution completion point is closest to a time when the determining is being executed as the calculation device to execute the new process.

6. The task deployment method according to claim 1, wherein the calculating includes calculating the execution completion point for the new process based on the acquired number of processes and a process execution rate corresponding to a type of the new process among a plurality of process execution rates, the plurality of process execution rates respectively corresponding to one of a plurality of types of the processes executed by the plurality of calculation devices.

7. The task deployment method according to claim 1, wherein the process execution rate is a value indicating a number of processes of which execution is completed per unit time.

8. The task deployment method according to claim 1, wherein the execution completion point is a time until execution of the new process executed by a calculation device of the plurality of calculation devices to be completed from a time when the execution is started.

9. A task deployment apparatus, comprising:
   a memory; and
   a processor coupled to the memory and configured to:
      acquire, at a predetermined interval, a number of processes in a queue that stores the processes executed by a plurality of calculation devices included in at least one of one or more nodes until a timing at which a new process to be executed occurs,
      set, for each of the plurality of calculation devices, a process execution rate through communication with the plurality of calculation devices,
      calculate, for each of the plurality of calculation devices, an execution completion point for the new process in a case where the new process is started by dividing the acquired number of processes in the queue by the determined process execution rate for each of the respective calculation devices,
      determine, from among the plurality of calculation devices, a calculation device that completes execution of the new process by a predetermined time limit, based on the execution completion point calculated for each of the plurality of calculation devices,
      cause the at least one of one or more nodes to add a dummy process to the queue when the number of processes is acquired, and
      when the calculation device to execute the new process is determined, cause the determined calculation device to execute a process for replacing the new process with the dummy process.

10. A non-transitory computer-readable storage having stored therein a program for task deployment, the program executing a process comprising:
    acquiring, at a predetermined interval, a number of processes in a queue that stores the processes executed by a plurality of calculation devices included in at least one of one or more nodes until a timing at which a new process to be executed occurs;
    setting, for each of the plurality of calculation devices, a process execution rate through communication with the plurality of calculation devices;
    calculating, for each of the plurality of calculation devices, an execution completion point for the new process in a case where the new process is started by dividing the acquired number of processes in the queue by the determined process execution rate for each of the respective calculation devices;
    determining, from among the plurality of calculation devices, a calculation device that completes execution of the new process by a predetermined time limit, based on the execution completion point calculated for each of the plurality of calculation devices;
    causing the at least one of one or more nodes to add a dummy process to the queue when the number of processes is acquired; and
    when the calculation device to execute the new process is determined, causing the determined calculation device to execute a process for replacing the new process with the dummy process.

11. The storage medium according to claim 10, wherein the acquiring includes acquiring, at the predetermined interval, the number of processes in the queue that stores the processes executed by calculation devices randomly selected from among a plurality of calculation devices included in the one or more nodes.

12. The storage medium according to claim 10, wherein the acquiring includes acquiring, at the predetermined interval, the number of processes in the queue that stores the processes executed by each of a plurality of calculation devices included in the one or more nodes, and
    the causing the at least one of one or more nodes to add the dummy process includes causing a node that includes a calculation device that acquired a relatively small number of processes among the plurality of calculation devices to add the queue that stores processes related to the relatively small number of processes.

13. The storage medium according to claim 10, further comprises
    receiving an execution request for the new process that includes a transmission time limit for an execution result of the new process,
    wherein the determining includes determining a calculation device in which the calculated execution completion point is earlier than the transmission time limit included in the received execution request as the calculation device to execute the new process.

14. The storage medium according to claim 10, wherein the determining includes determining a calculation device in which the calculated execution completion point is closest to a time when the determining is being executed as the calculation device to execute the new process.

15. The storage medium according to claim 10, wherein the calculating includes calculating the execution completion point for the new process based on the acquired number of processes and a process execution rate corresponding to a type of the new process among a plurality of process execution rates, the plurality of process execution rates respectively corresponding to one of a plurality of types of the processes executed by the plurality of calculation devices.

* * * * *